(12) United States Patent
Smith et al.

(10) Patent No.: US 6,226,367 B1
(45) Date of Patent: *May 1, 2001

(54) CALLING LINE IDENTIFICATION WITH LOCATION ICON

(75) Inventors: Colin Donald Smith, Ottawa; Brian Finlay Beaton, Orleans, both of (CA)

(73) Assignee: Nortel Networks Limited (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/842,019

(22) Filed: Apr. 23, 1997

(51) Int. Cl.⁷ .......................... H04M 15/06; H04M 11/00
(52) U.S. Cl. .................. 379/142; 379/93.17; 379/93.23; 455/415
(58) Field of Search ...................................... 379/142, 265, 379/266, 118, 120, 127, 130; 455/93.17, 93.23, 410, 411

(56) References Cited

U.S. PATENT DOCUMENTS

| | | | |
|---|---|---|---|
| H1714 | * 3/1998 | Partridge | 379/93.01 |
| 5,283,818 | * 2/1994 | Klausner et al. | 379/142 |
| 5,414,457 | * 5/1995 | Kadowaki et al. | 379/142 |
| 5,506,837 | * 4/1996 | Sollner et al. | 379/142 |
| 5,546,447 | * 8/1996 | Skarbo et al. | 379/142 |
| 5,553,125 | * 9/1996 | Martensson | 379/142 |
| 5,559,868 | * 9/1996 | Blonder | 379/142 |
| 5,590,189 | * 12/1996 | Turnbull et al. | 379/142 |
| 5,608,788 | * 3/1997 | Demlow et al. | 379/142 |
| 5,668,852 | * 9/1997 | Holmes | 379/142 |
| 5,754,636 | * 5/1998 | Bayless et al. | 379/142 |
| 5,832,072 | * 11/1998 | Rozenblit | 379/142 |
| 5,848,356 | * 12/1998 | Jambhekar et al. | 455/403 |
| 5,889,852 | * 3/1999 | Rosecrans et al. | 379/142 |
| 6,084,951 | * 7/2000 | Smith et al. | 379/93.17 |

OTHER PUBLICATIONS

"Nokia 9000 Communicator User's Manual," Nokia Corporation, 1996, pp. 1–1 through 16–1 (48 pages total).

* cited by examiner

Primary Examiner—Curtis Kuntz
Assistant Examiner—Rexford N. Barnie
(74) Attorney, Agent, or Firm—Finnegan, Henderson, Farabow, Garrett & Dunner, L.L.P.

(57) ABSTRACT

The system and method consistent with the present invention provides a graphical icon identifying the caller and the location of the call for a communication device.

30 Claims, 21 Drawing Sheets

BOBBY BONITO 738-9157

FIG. 1

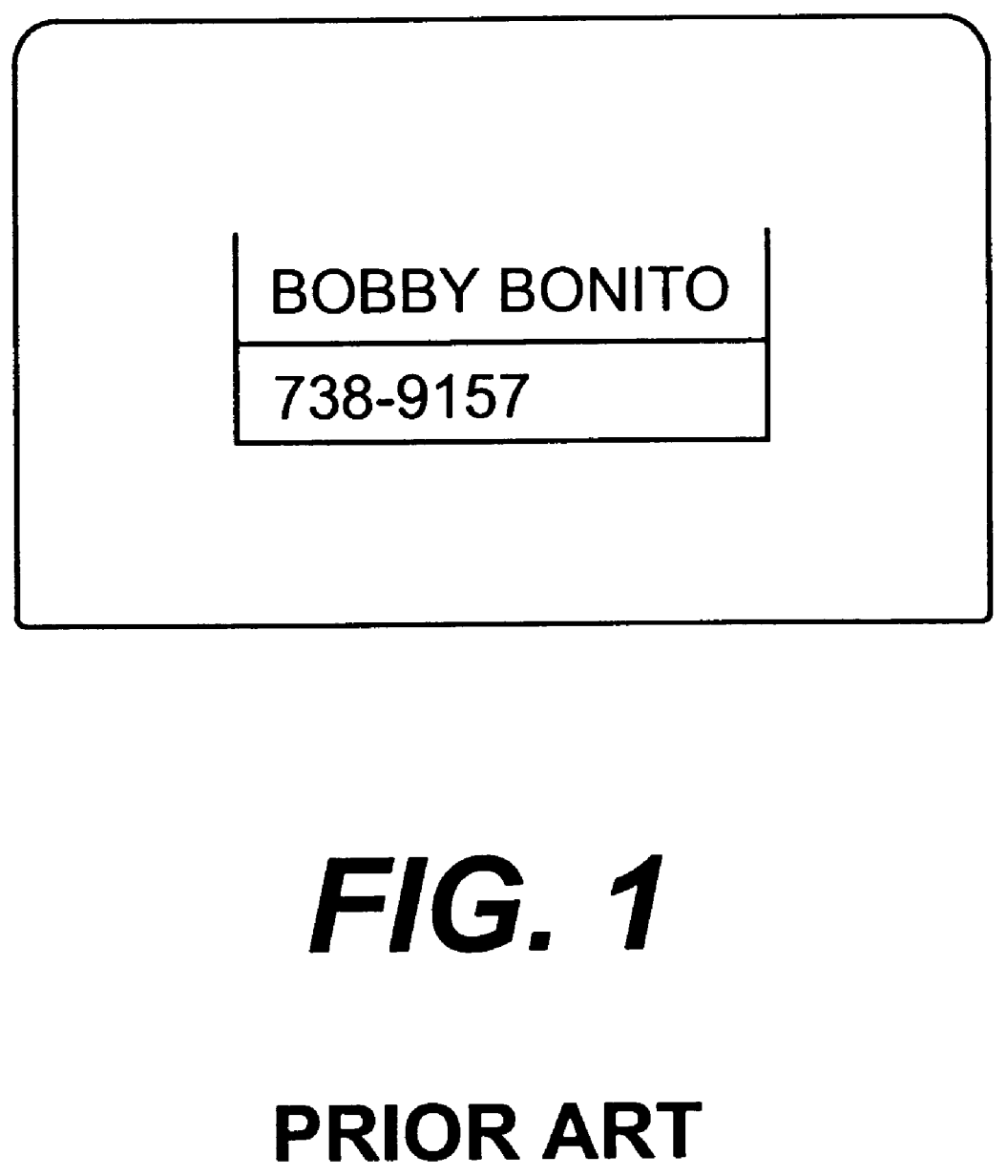

PRIOR ART

TABLE 600
| NAME | TITLE | ORGANIZATION | ADDRESS | COMMUNICATION ADDRESS | ICONS | MISC |
|---|---|---|---|---|---|---|
| NAME A | PRESIDENT | ABC CORP. | 123 ABC DR. SOMEWHERE, CA 90210 | (613) 543-9999 |  (HOME) | 19 1/2 SHIRT SIZE B-DAY 1-2-34 |
| | | | | (613) 789-4356 |  (WORK) | |
| | | | | (613) 555-3496 |  (CELLULAR) | |
| | | | | NAME@CA |  (E-MAIL) | |
| | | | | (613) 789-4357 |  (FAX) | |
| NAME B ... | | | | | | |
| NAME Z | | | | | | |
*FIG. 6*

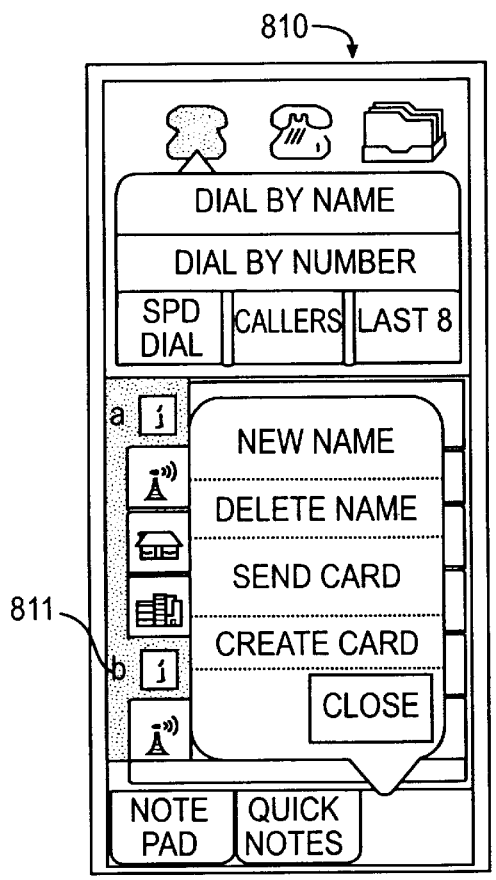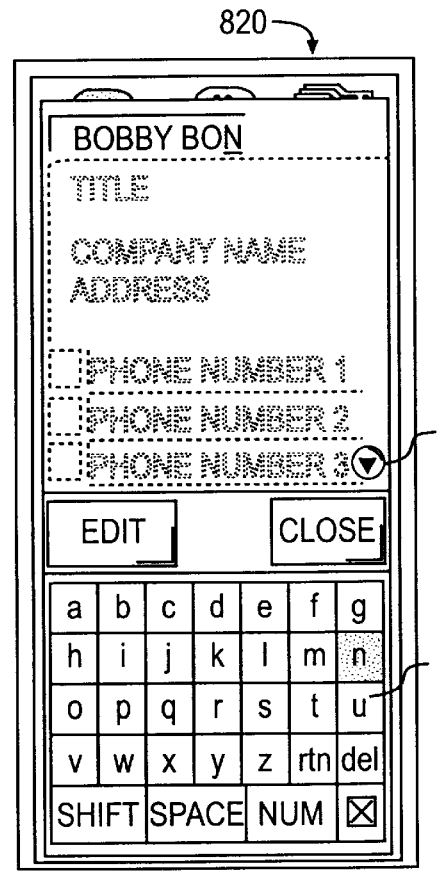
*FIG. 8A*  *FIG. 8B*
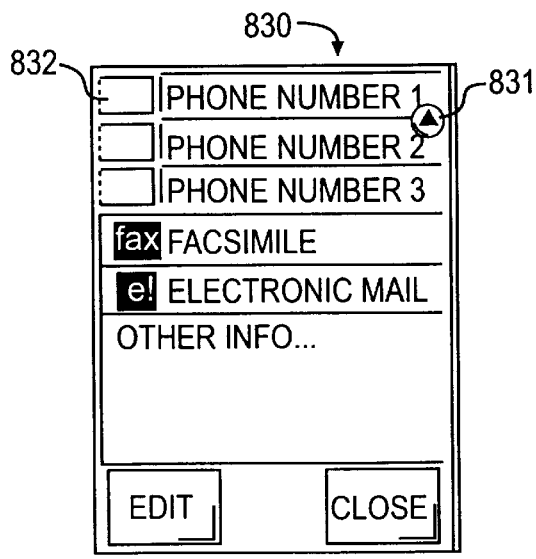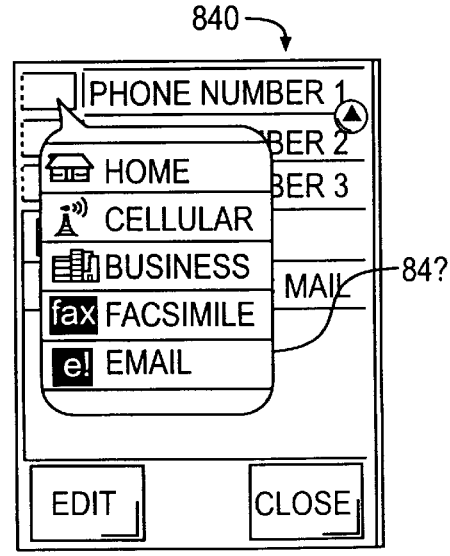
*FIG. 8C*  *FIG. 8D*

TABLE 900
| 910<br><br>LOCATION/TYPE OF COMMUNICATION CHANNEL | (HOME)  |
| --- | --- |
| | (OFFICE)  |
| | (CELLULAR)  |
| | (CAR/ MOBILE)  |
| 920<br><br>TYPE OF COMMUNICATION CHANNEL | (EMAIL)  |
| | (FAX)  |
| | (SMS)  |
| | (PAGING)  |
| 930<br><br>CUSTOMIZED ICONS | (SPECIAL PERSON or GROUP)  |
| | (CORPORATE/ BUSINESS IDENTIFIERS) |
| | (SPECIAL SERVICE) (CONFERENCE CALL)  |
FIG. 9

CALLING LINE IDENTIFICATION WITH LOCATION ICON

RELATED APPLICATIONS

This application is related to U.S. patent application, Ser. No. 08/842,015, entitled MULTITASKING GRAPHICAL USER INTERFACE; U.S. patent application, Ser. No. 08/841,485, entitled Electronic Business Cards; U.S. patent application, Ser. No. 08/841,486, entitled SCROLLING WITH AUTOMATIC COMPRESSION AND EXPANSION; U.S. patent application, Ser. No. 08/842,017, entitled CALLING LINE IDENTIFICATION WITH DRAG AND DROP CAPABILITY; U.S. patent application, Ser. No. 08/842,020, entitled INTEGRATED MESSAGE CENTER; and U.S. patent application, Ser. No. 08/842,036, entitled ICONIZED NAME LIST, all of which are filed concurrently herewith, and all of which are hereby incorporated by reference.

BACKGROUND OF THE INVENTION

The present invention relates generally to graphical user interfaces in telephony, and more particularly to scrolling lists with automatic compression and expansion.

In light of the rapid technological developments and globalization of the world economy, the role of telecommunication is becoming increasingly important. As such, there is a growing focus on using state of the art computer technology to provide new and improved telecommunication capabilities. The capability of combining voice and digital data transmission is enabled by the GSM (Global System for Mobile Communications) protocol.

One popular feature, commonly referred to as Caller ID or CLID (Calling Line Identification), displays the caller's name and telephone number on the receiver's device as shown in FIG. 1A. CLID information is stored at a public telephone network and delivered to the receiver's display device if the receiver subscribes to the Caller ID feature.

There are also telephones that can store a list containing names, multiple telephone numbers, and address information. PDAs (Personal Digital Assistants), provide graphical icons associated with particular telephone numbers.

Also available today are communicators that facilitate various types of communication such as voice, faxes, SMS (Short Messaging Services) messages, and Internet-related applications. One such product offers a "contacts" feature for managing contact information including names, telephone numbers, and addresses. It also allows exchanging contact information as business cards in an SMS message.

Conventional devices, however, have two distinct modes of operation: open and closed. When closed, the product operates as a telephone and the user cannot access the display of the contacts cards. To display the contacts cards, the product must be open and in hands-free mode. When the product is open, if the phone part of the product was not previously turned on, the user must close the product and turn on the phone part of the product, then reopen the product in PDA mode to make a call.

Additionally, the product has separate, distinct applications that handle each type of communication tasks. The distributed interface of the product is highly compartmentalized by applications, thus restricting the sharing of information between applications. Specifically, the telephone application and contacts application are completely independent and must be launched separately. Because the two applications do not share information, it sometimes requires the user to input the same information in both applications. Furthermore, features of each application may only be activated within the respective application.

When a user is in a telephone application, for example, a user cannot manipulate a contacts card. Therefore, to modify or update a contacts card information, the user must launch a contacts application. Similarly, the user can initiate a call only from a telephone application and not from a contacts card. Even if a user enters a telephone number in a telephone application, this information cannot be saved in a contacts application as a new contacts card. Likewise, the product does not allow information to be shared between the telephone application and the contacts application.

To create a contacts card, the user must launch the contacts application, select "logs," choose a communication event (such as call received), then press "create card" to create a new contacts card. Even so, these series of steps only transfers the telephone number but not the associated name to a new contacts card, and any additional information must be entered within the contacts application. To initiate a call, the user must leave the contacts application by pressing the hard key for "telephone." The telephone directory displays only the names but not related fields.

Current telecommunication features also do not take full advantage of CLID information. Specifically, CLID information is used for display purposes only in providing information to the receiver about the caller. After the CLID information is displayed, it cannot be manipulated, transferred to another device or user, or used in other application programs.

Additionally, besides the name and the number of the caller, CLID does not provide additional information that further defines the type of communication device or the location of the caller. For example, the receiver may not know or remember whether the displayed number is a wireline or wireless, or a work or home telephone number. This type of information would further assist the receiver in determining the caller's device and location, thus, further defining the importance of the call.

Generally, telephone networks only transmit the caller's CLID information to the receiver. There are currently some private networks that transmit CLID information to both the caller and the receiver. As mentioned above, however, the transmitted CLID information has been limited to only the name and the number of the other party.

Moreover, directories are stored in the memory of the communication device, which generally has limited storage capacity. This restricts the device's ability to store a desired amount of information in the device. Related to this problem is the need to store information at different locations within the device. For example, speed dial data is stored separately from the main directory data Not only does this duplicate the data entry process, data maintenance and updates need to be performed for each location to avoid unsynchronization of the data.

Searching for an entry in the directory can also be tedious. Unless the user remembers the name of the entry and conducts a text search for the desired entry, the user must scroll through each entry sequentially. In doing so, if each entry contains many related fields, scrolling through each entry while displaying other unnecessary fields reduces the efficiency of the search. Not only does this slow down the search significantly, it also makes the search more difficult. Additionally, the directory does not present additional information that further defines the type of communication device or the location of the caller in an easily recognizable manner.

Therefore, it is desirable to integrate various telecommunication applications to simplify user interfaces and facilitate efficient information sharing.

It is also desirable to manipulate the CLID information to provide enhanced user interfaces.

It is further desirable to provide additional information related to the CLID to better identify the caller's identity and location of the call.

In addition, it is further desirable to improve the search feature to scroll through the directory more easily.

SUMMARY OF THE INVENTION

Systems and methods consistent with the present invention automatically compress and expand the display of the directory during scrolling.

Specifically, a method for presenting information to a user of a communication device consistent with the present invention comprises several steps. Initially, a directory of entries each including a telephone number and an associated icon is stored in a memory. A call is then received from a caller over the telephone network, and the caller's telephone number and the associated icon are displayed.

A system for presenting information to a user of a communication device comprises a database, a receiving means, and a display. Initially, a database stores a directory of entries each including a telephone number and an associated icon. Thereafter, the receiving means receives a call from a caller over the telephone network, and a display displays the caller's telephone number and the associated icon.

BRIEF DESCRIPTION OF THE DRAWINGS

The accompanying drawings, which are incorporated in and constitute a part of this specification, illustrate the invention and together with the description, serve to explain the principles of the invention.

In the drawings,

FIG. 1 shows a prior art CLID display;

FIG. 6 is a table illustrating the format of the information stored in the directory;

FIGS. 8A–8D show sample screens for creating a new EBC;

FIG. 9 is a table illustrating exemplary icons;

DESCRIPTION OF THE PREFERRED EMBODIMENT

Figure 2:
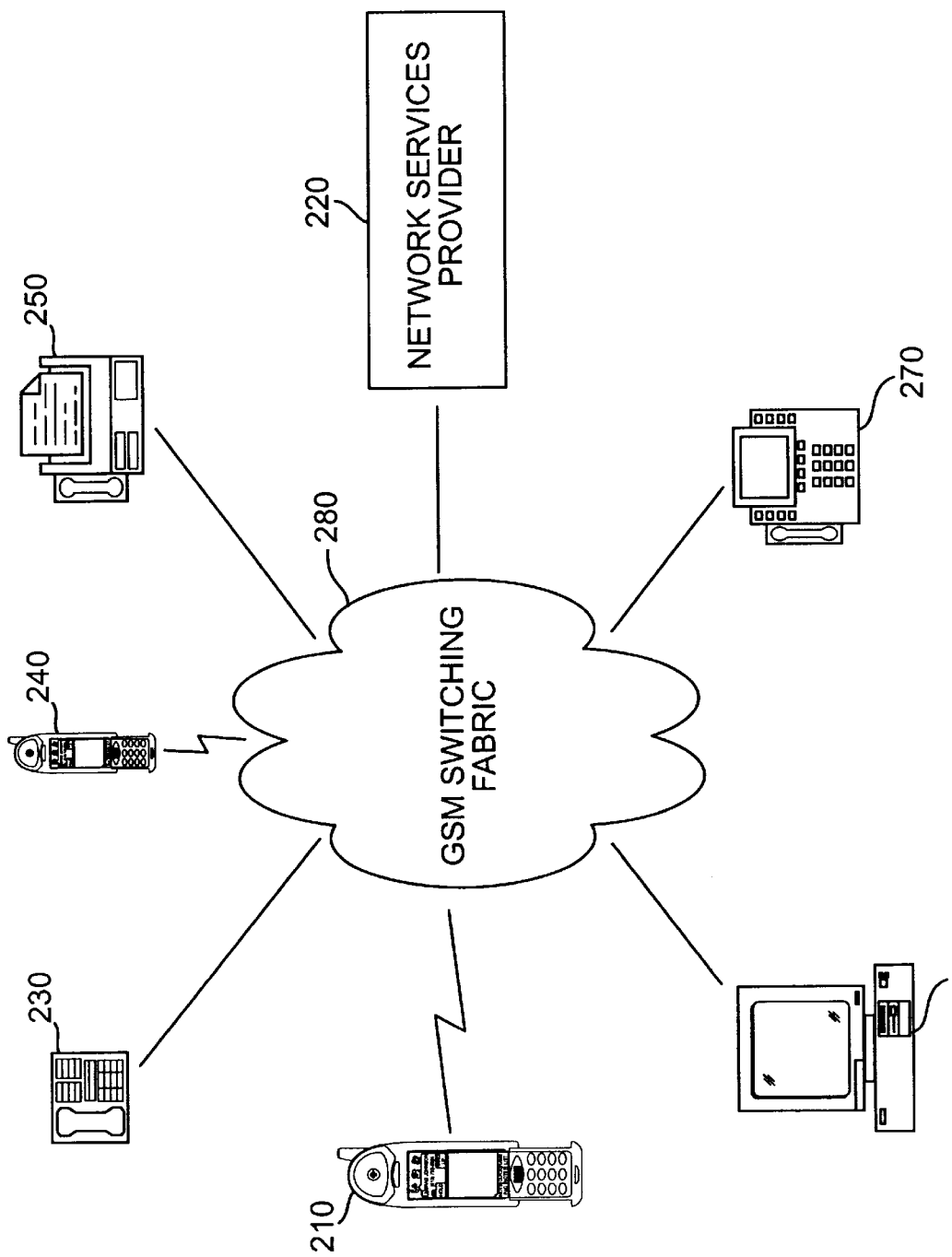
FIG. 2 is a diagram of a communication network consistent with the principles of the present invention.

Reference will now be made in detail to the present preferred embodiment of the invention, an example of which is illustrated in the accompanying drawings. Where appropriate, the same reference numerals refer to the same or similar elements. While the appended claims define the scope of the invention, the following description does not limit that scope.

System Architecture

FIG. 2 shows a communications network containing mobile telephone 210 preferably having the multitasking graphical user interface of the present invention. A user communicates with a variety of communication equipment, including external servers and databases, such as network services provider 220, using mobile telephone 210.

The user also uses mobile telephone 210 to communicate with callers having different types of communication equipment, such as ordinary telephone 230, caller mobile telephone 240, similar to user mobile telephone 210, facsimile equipment 250, computer 260, and Analog Display Services Interface (ADSI) telephone 270. The user communicates with network services provider 220 and caller communication equipment 230 through 270 over a communications network, such as GSM switching fabric 280. FIG. 2 shows caller communication equipment 230 through 270 directly connected to GSM switching fabric 280. Although FIG. 2 shows caller communication equipment 230 through 270 directly connected to GSM switching fabric 280, more typically, this equipment connects to GSM switching fabric 280 via another type of network, such as a Public Switched Telephone Network (PSTN).

The user communicates with a caller or network services provider 220 by establishing either a voice call, a data call, or by sending an SMS message. GSM networks provide an error-free, guaranteed delivery transport mechanism by which callers can send short point-to-point messages, i.e., SMS messages, through the GSM network, such as GSM switching fabric 280, in a GSM signaling channel, simultaneously with, or without, a voice or data call. GSM protocol limits the length of the short messages to a maximum of 140 bytes in length. GSM protocol limits the length of the standard SMS text message to a maximum of 140 bytes. However, GSM protocol permits longer messages to be formed by concatenating several messages together, transparent to the caller. Because GSM protocol performs concatenation transparently, the caller is not subject to any restriction on message length.

GSM telephone networks can transfer data as CLID information and USSD. One example of such network is the GSM network, which facilitates the transfer of custom defined data. The switches handling the call, however, require an application program, consistent with the standard industry practice, capable of recognizing the USSD data structure to complete the transfer of data from one device to another device.

Figure 3:
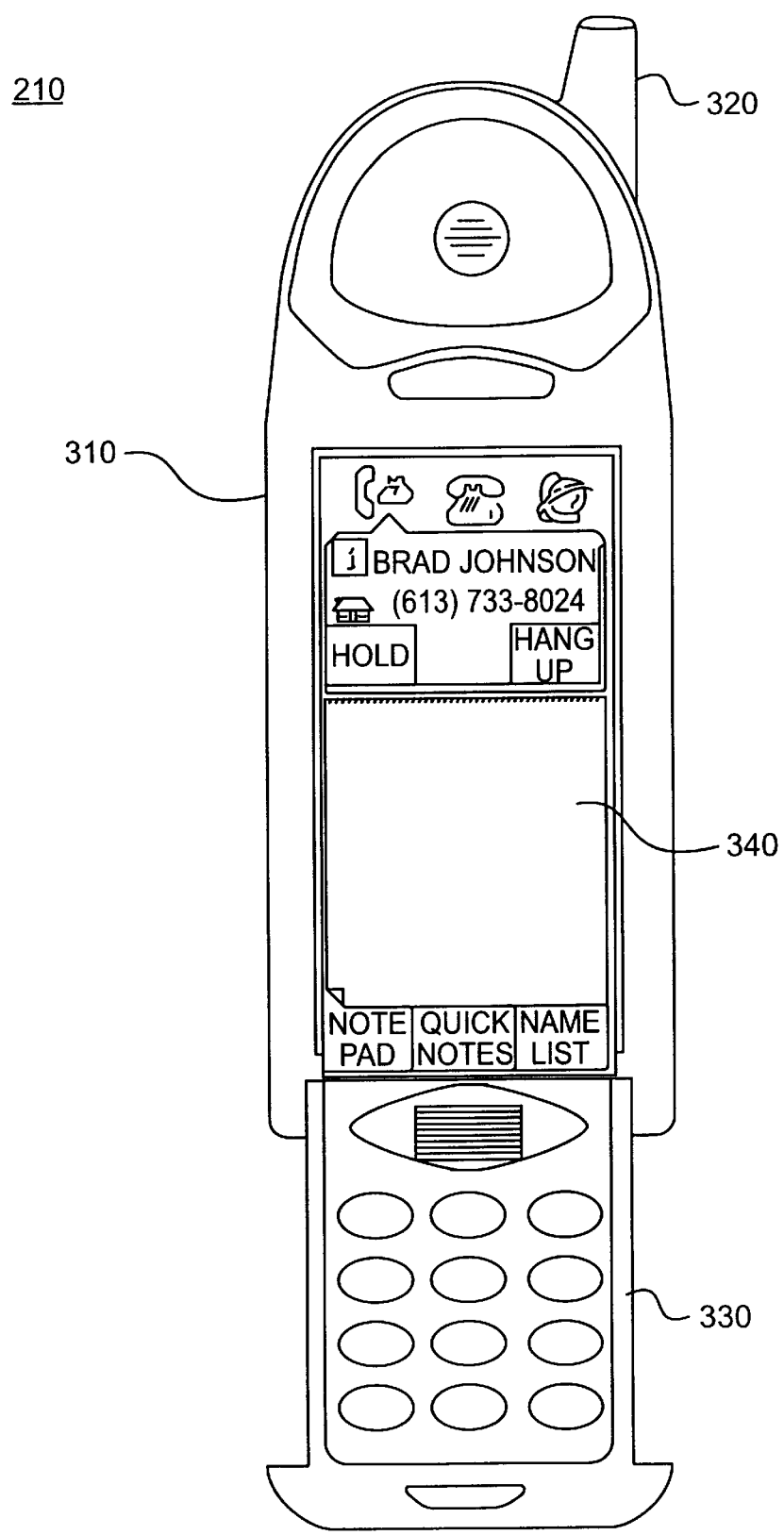
FIG. 3 is a diagram of a mobile telephone shown in FIG. 2.

Mobile telephone 210 provides a user-friendly interface to facilitate incoming and outgoing communication by the user. FIG. 3 shows that mobile telephone 210 includes main housing 310, antenna 320, keypad 330, and display 340.

Figure 4:
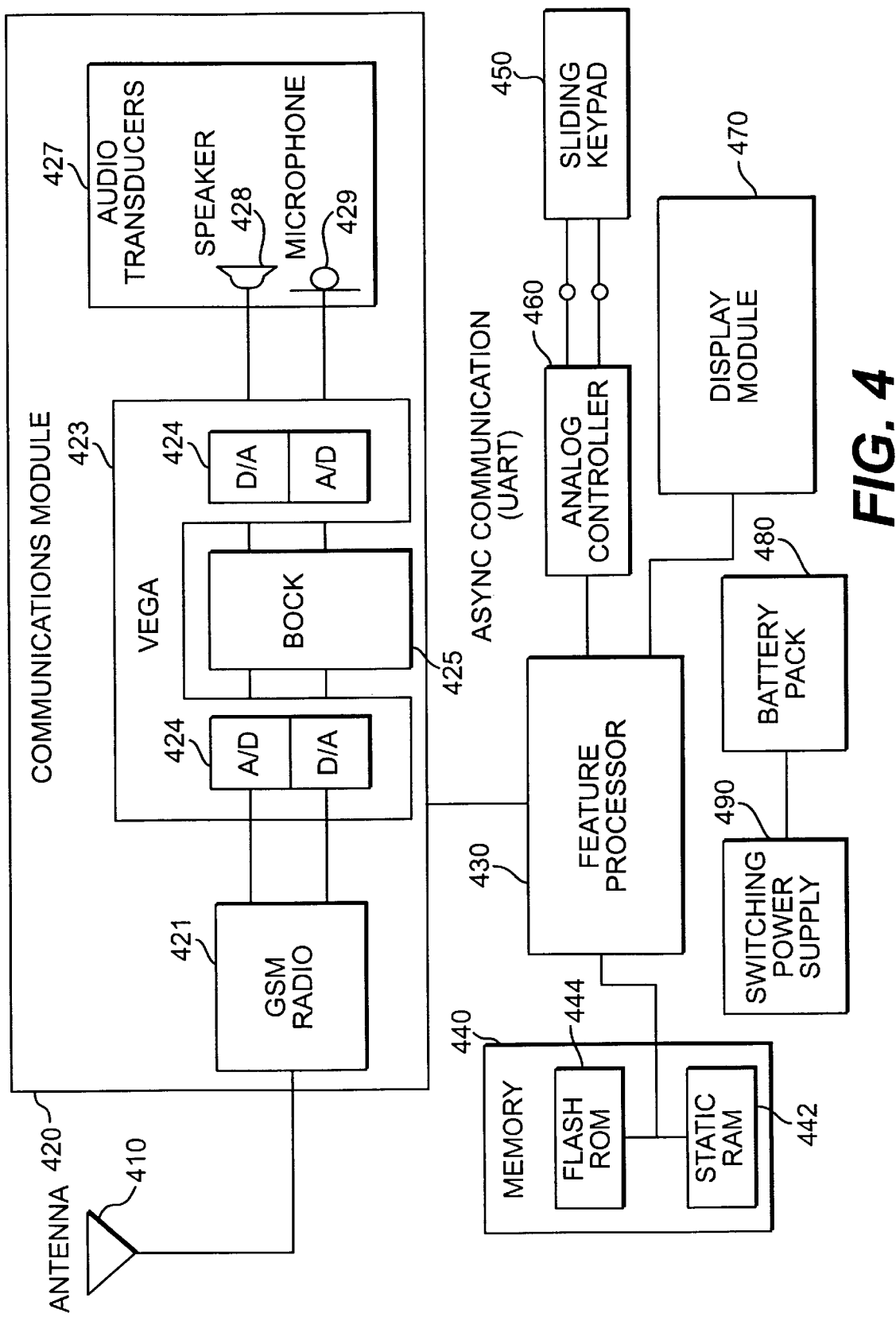
FIG. 4 is a block diagram showing the elements of the mobile telephone of FIG. 3.

FIG. 4 shows the hardware elements in mobile telephone 210 include antenna 410, communications module 420, feature processor 430, memory 440, sliding keypad 450, analog controller 460, display module 470, battery pack 480, and switching power supply 490.

Antenna 410 transmits and receives radio frequency information for mobile telephone 210. Antenna 410 preferably comprises a planar inverted F antenna (PIFA)-type or a short stub (2 to 4 cm) custom helix antenna. Antenna 410 communicates over GSM switching fabric 280 using a conventional voice B-channel, data B-channel, or GSM signaling channel connection.

Communications module 420 connects to antenna 410 and provides the GSM radio, baseband, and audio functionality for mobile telephone 210. Communications module 420 includes GSM radio 421, VEGA 423, BOCK 425, and audio transducers 427.

GSM radio 421 converts the radio frequency information to/from the antenna into analog baseband information for presentation to VEGA 423. VEGA 423 is preferably a Texas Instruments VEGA device, containing analog-to-digital A/D)/digital-to-analog (D/A) conversion units 424. VEGA 423 converts the analog baseband information from GSM radio 421 to digital information for presentation to BOCK 425.

BOCK 425 is preferably a Texas Instruments BOCK device containing a conventional ARM microprocessor and a conventional LEAD DSP device. BOCK 425 performs GSM baseband processing for generating digital audio signals and supporting GSM protocols. BOCK 425 supplies the digital audio signals to VEGA 423 for digital-to-analog conversion. VEGA 423 applies the analog audio signals to audio transducers 427. Audio transducers 427 include speaker 428 and microphone 429 to facilitate audio communication by the user.

Feature processor 430 provides graphical user interface features and a Java Virtual Machine (JVM). Feature processor 430 communicates with BOCK 425 using high level messaging over an asynchronous (UART) data link. Feature processor 430 contains additional system circuitry, such as a liquid crystal display (LCD) controller, timers, UART and bus interfaces, and real time clock and system clock generators (not shown).

Memory 440 stores data and program code used by feature processor 430. Memory 440 includes static RAM 442 and flash ROM 444. Static RAM 442 is a volatile memory that stores data and other information used by feature processor 430. Flash ROM 444, on the other hand, is a non-volatile memory that stores the program code executed by feature processor 430.

Sliding keypad 450 enables the user to dial a telephone number, access remote databases, and manipulate the graphical user interface features. Sliding keypad 450 preferably includes a mylar resistive key matrix that generates analog resistive voltage in response to actions by the user. Sliding keypad 450 preferably connects to main housing 310 (FIG. 4) of mobile telephone 210 through two mechanical "push pin"-type contacts.

Analog controller 460 is preferably a Phillips UCB1100 device that acts as an interface between feature processor 430 and sliding keypad 450. Analog controller 460 converts the analog resistive voltage from sliding keypad 450 to digital signals for presentation to feature processor 430.

Display module 470 is preferably a 160 by 320 pixel LCD with an analog touch screen overlay and an electroluminescent backlight. Display module 470 operates in conjunction with feature processor 430 to display the graphical user interface features.

Battery pack 480 is preferably a single lithium-ion battery with active protection circuitry. Switching power supply 490 ensures highly efficient use of the lithium-ion battery power by converting the voltage of the lithium-ion battery into stable voltages used by the other hardware elements of mobile telephone 210.

Figure 5:
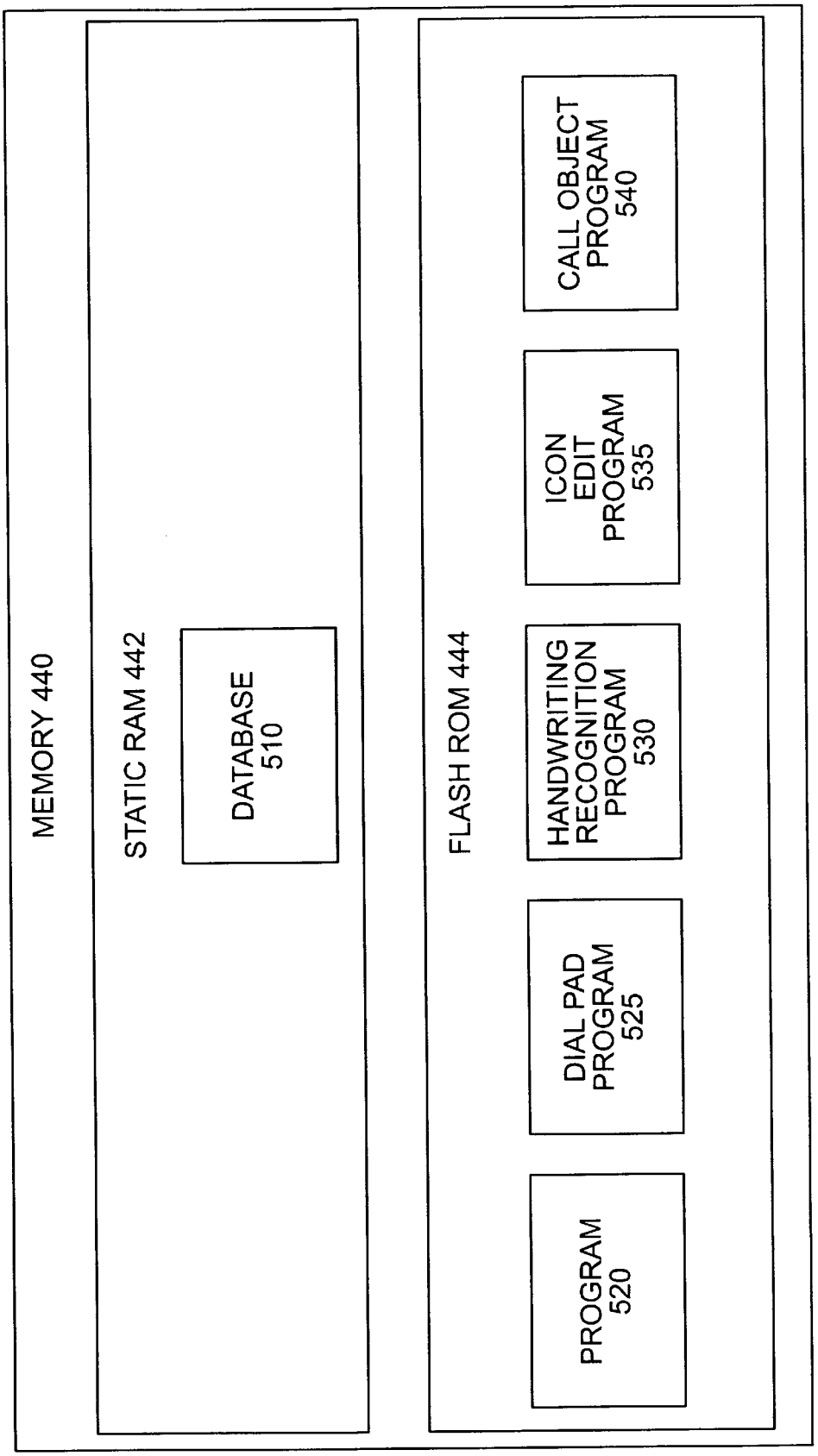
FIG. 5 is a block diagram showing the components of the memory of FIG. 4.

FIG. 5 is a block diagram illustrating the components of memory 440. Static RAM 442 contains a database 510 storing various types of data including a table representing a telephone directory.

Flash ROM 444 contains various programs including a program 520, a dialpad program 525, a handwriting recognition program 530, an icon edit program 535, and a call object program 540. Program 520, preferably written in languages such as Java, C, or C++for Macintosh, is a main program overseeing the operation of mobile telephone 210.

Dialpad program 525 facilitates data entry using keypad 330 using a typical keypad algorithm. Handwriting recognition program 530 recognizes and translates handwriting input from display 340. Icon edit program 535 facilitates graphical input as bitmaps. Programs 525, 530, and 535 may be one of any commercially available packages. Finally, call object program 540 may be a user-defined special feature program or a macro for telephony.

Currently, CLID information is stored in a telephone network and delivered to the receiver's device. Mobile telephone 210, consistent with the present invention, stores and interacts with highly descriptive information in database 510 of FIG. 5. Alternatively, all or part of the descriptive information may be stored at an external device or a central server.

Table 600 of FIG. 6 is a table illustrating the format of the information stored. Each row represents a single entry and each column within a row represents a field of the entry. In one embodiment of the present invention, table 600 contains many fields including fields for the name of the person, title of the person, name of the organization, communication addresses or numbers (e.g., multiple telephone numbers, fax number, e-mail address) as well as their associated icon, and a field for user-defined text. For exemplary purposes, features of the present invention may be explained using a telephone number. However, telephone number is used hereinafter to refer to any communication address or number. Program 520 displays each entry containing the fields in FIG. 6 in the form of a business card (hereinafter referred as Electronic Business Card 15 or EBC). EBCs, including location icons, may be formatted as USSD (Unstructured Supplementary Service Data) and may be transmitted among users in the GSM network.

Figure 7:
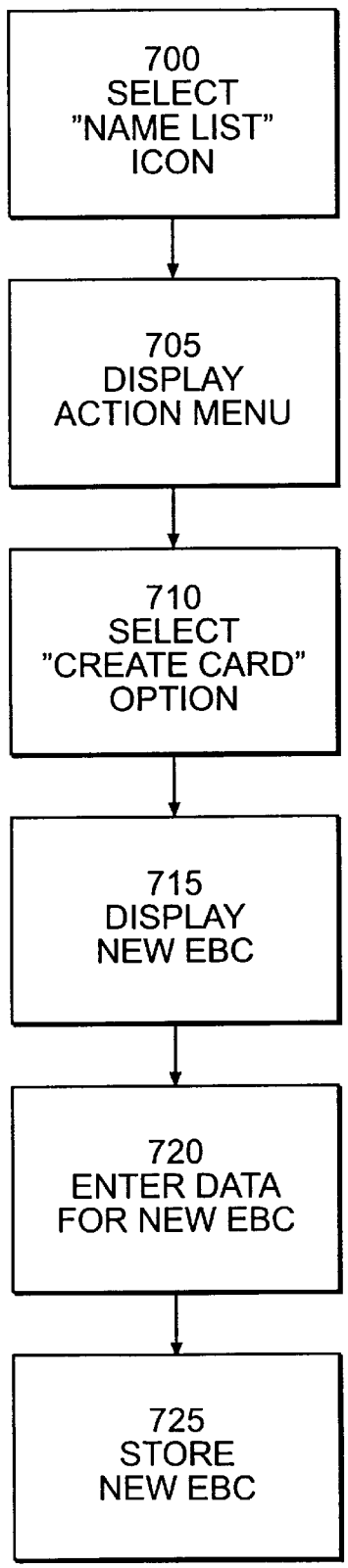
FIG. 7 is a flowchart illustrating the process for creating a new Electronic Business Card (EBC)

FIG. 7 shows a flowchart for creating a new EBC, and FIGS. 8A–8D show sample screens. First, a user selects a "Name List" icon in screen 810 (step 700), which in turn displays an action menu 811 as shown in FIG. 8A (step 705). A display driver oversees the display in display 340. If the user selects a "Create card" option (step 710), program 520 presents screen 820 from which the user may enter the data for the new EBC (step 715).

The present invention facilitates many modes of data entry. For example, the user may enter the data using keypad 330, in which case dialpad program 525 interprets the input data. Alternatively, the user may input data by touching an on-screen keyboard 822. Also, the user may enter data by writing on display 340, which is then interpreted by handwriting recognition program 530. Voice command is another mode of data entry facilitated by state-of-the-art voice recognition technology.

Screen 820 (FIG. 8B) shows a blank EBC as it first appears. To assist the user, the blank EBC preferably contains watermark headings for each field. If display 340 cannot display the full screen, program 520 displays scroll buttons 821 and 831 for the user to scroll the display up or down by simply touching scroll buttons 821 and 831. Alternatively, the user may scroll using the hard keys on keypad 330. In screen 820, the user is in the process of entering the name "Bobby Bon" (step 720).

Screen 830 (FIG. 8C) is the bottom portion of the blank EBC displaying additional user-defined text at the bottom. If the user selects an icon selection button 832, program 520 displays a screen 840 (FIG. 8D) with an icon menu 841 containing several predesigned icons for various communication devices and locations, for example, home, cellular, business, facsimile, e-mail, or others. In an embodiment consistent with the present invention, the icons preferably represent some characteristic of the associated telephone number.

FIG. 9 is a table 900 illustrating certain exemplary icons. Row 910 of table 900 shows exemplary icons representing the location or type of communication terminal of the telephone number, e.g., home, office, cellular, or car/mobile. Next, row 920 shows exemplary icons representing the type of communication channel, e.g., e-mail, fax, SMS, or paging. Finally, row 930 shows exemplary custom icons, e.g., special person or group, corporate/business identifiers, or special service.

As illustrated, icons may present a certain group of people. Custom icons may also represent specialized services or pre-programmed macros. For example, a macro may perform all steps necessary to set up a conference call to a predetermined group of people. One skilled in the art may, however, easily modify the number and the type of icons shown in icon menu 841 and table 900.

Figure 10:
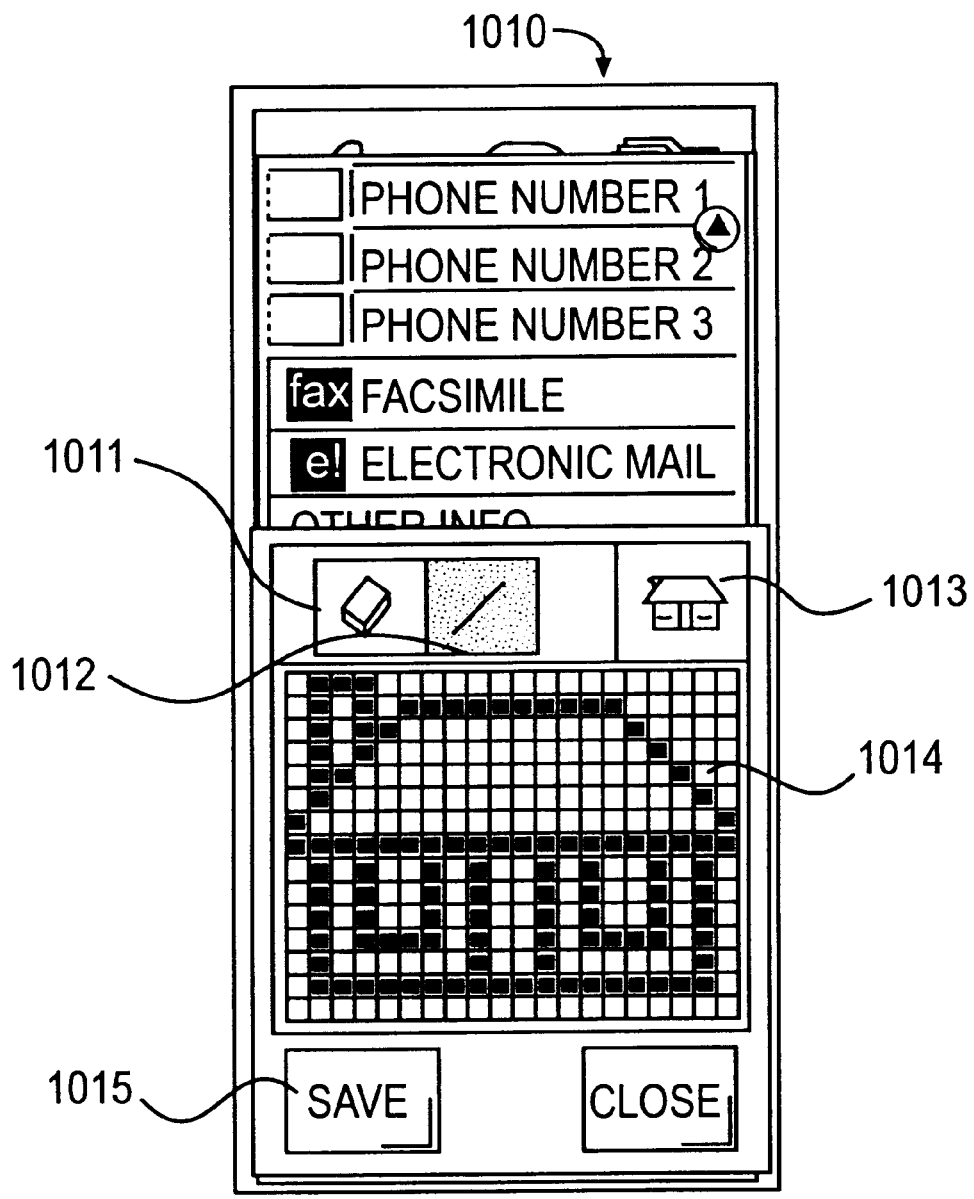
FIG. 10 is a sample screen for creating or modifying an icon.

The user also has an option of creating a new icon or modifying an existing one under "Others" option of icon menu 841. If the user selects the "Other" option, program 520 initiates icon edit program 535, which opens an icon editing screen 1010 shown in FIG. 10. Icon editing screen 1010 contains an eraser button 1011 and a draw button 1012 to create or edit an icon.

In the example icon editing screen 1010, a user has selected to edit an existing home icon. Icon edit program 535 displays the actual size icon in an icon view button 1013 as it would appear in the name list. Icon edit program 535 also provides an enlarged view of the icon in an icon bitmap view 1014. The user may erase or draw in the bits of the icon using eraser button 1011 and draw button 1012.

Alternatively, rather than using erasure button 1011 or draw button 1012, a user may turn on or off each bit of the icon simply by touching each block of icon shown in icon editing screen 1010. In this embodiment, a user may utilize erasure button 1011 and draw button 1012 to erase or draw a large section of the icon.

When the user finishes modifying the icons, the user may select a "Save" icon 1015 to save the modifications. Icon edit program 535 then stores the updated icon in the corresponding icon field of table 600. Program 520 also facilitates the user to add the new icon in icon menu 841 upon user selection. The user may also select to display the new icon in icon selection button 832 associated with a corresponding phone number.

Figure 11A:
FIGS. 11A–11B show sample screens illustrating a completed EBC.
Figure 11B:

FIGS. 11A and 11B show exemplary screens 1110 and 1120, respectively, displaying a completed EBC. In one embodiment consistent with the present invention, the EBC may be stored in memory 440 of mobile telephone 210 or at a central location (step 725). The central location may be a server, which may be connected to a telephone network or a data network.

A user can also create a new EBC using the CLID information transmitted over a telephone network, such as the GSM network. Specifically, if the user's device receives and displays the CLID information, i.e., the phone number of the caller, the user can create a new EBC by transferring the CLID information to the new EBC.

Figure 12C:
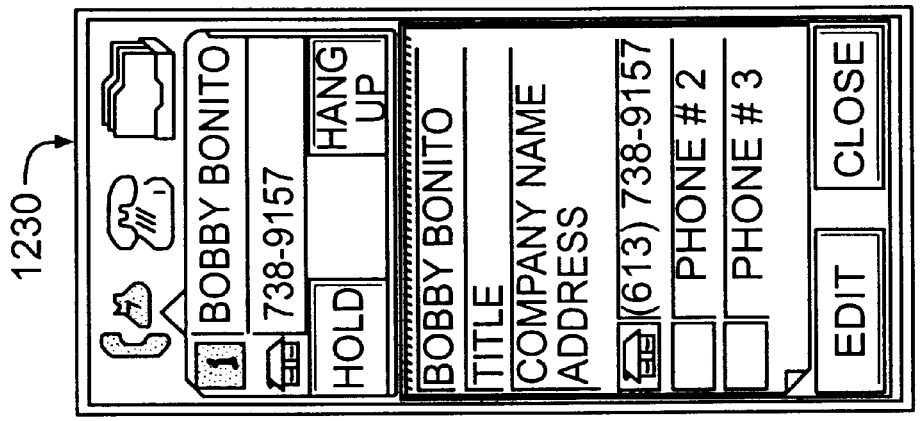
FIGS. 12A–12C show sample screens for creating an EBC using CLID information.
Figure 12B:
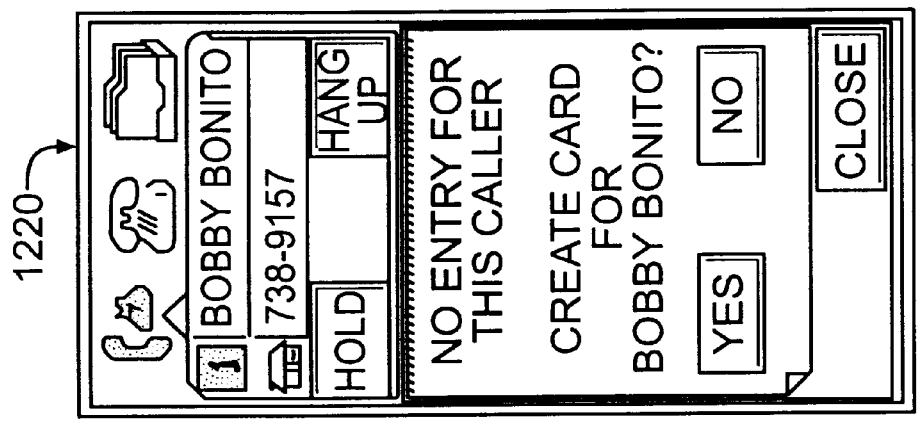
Figure 12A:
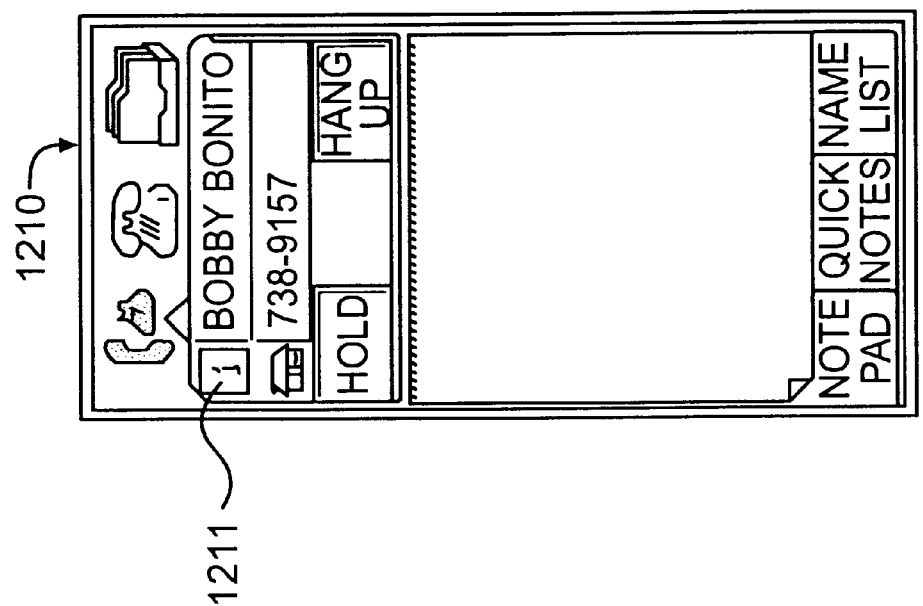

Referring to FIG. 12A, screen 1210 is an exemplary display, consistent with the present invention, of when the user receives a call from a caller. CLID information, "Bobby Bonito" and "738–9157," appears in the name and number fields, respectively. The user, while on the phone with the caller, may select an information icon 1211 to display the EBC associated with the caller. Upon selection, program 520 searches either the name or telephone field of stored EBCs to locate the match. If program 520 finds a match, program 520 displays the corresponding EBC.

If, however, there is no match, screen 1220 (FIG. 12B) presents an option to create a new EBC corresponding to the caller as shown in screen 1220. If the user selects not to create a new EBC, program 520 displays screen 1210 again for the remainder of the call. If the user chooses to create a new EBC for the caller, program 520 presents a blank EBC and automatically transfers the name and telephone numbers included in the CLID to the corresponding fields in the EBC.

For example, screen 1230 (FIG. 12C) illustrates that the caller's name "Bobby Bonito" and telephone number with the appropriate area code is transferred to the appropriate fields of the new EBC. The telephone number is identified as a home number by the associated home icon in the CLID information. Accordingly, program 520 also assigns a home icon with the caller's number. The user may input the remaining information through any input method described above. Thereafter, program 520 stores the EBC as a new entry in table 600.

A new EBC may be created using information manually entered by the user to initiate a call. After the user has manually entered the telephone number of the recipient, the user may select the "Create card" option of action menu 811 before initiating the call, during the call, or after the completion of the call. After selecting the "Create card" option, the user may enter other fields for that entry to be stored in table 600.

Once the EBCs have been created and stored, program 520 can present the EBCs to the user as a directory. A user can specify the fields of the EBC to be displayed in the directory by modifying program 520. In an exemplary display shown in FIG. 13A, screen 1310 displays the EBCs as a name list with corresponding telephone numbers.

Figure 14:
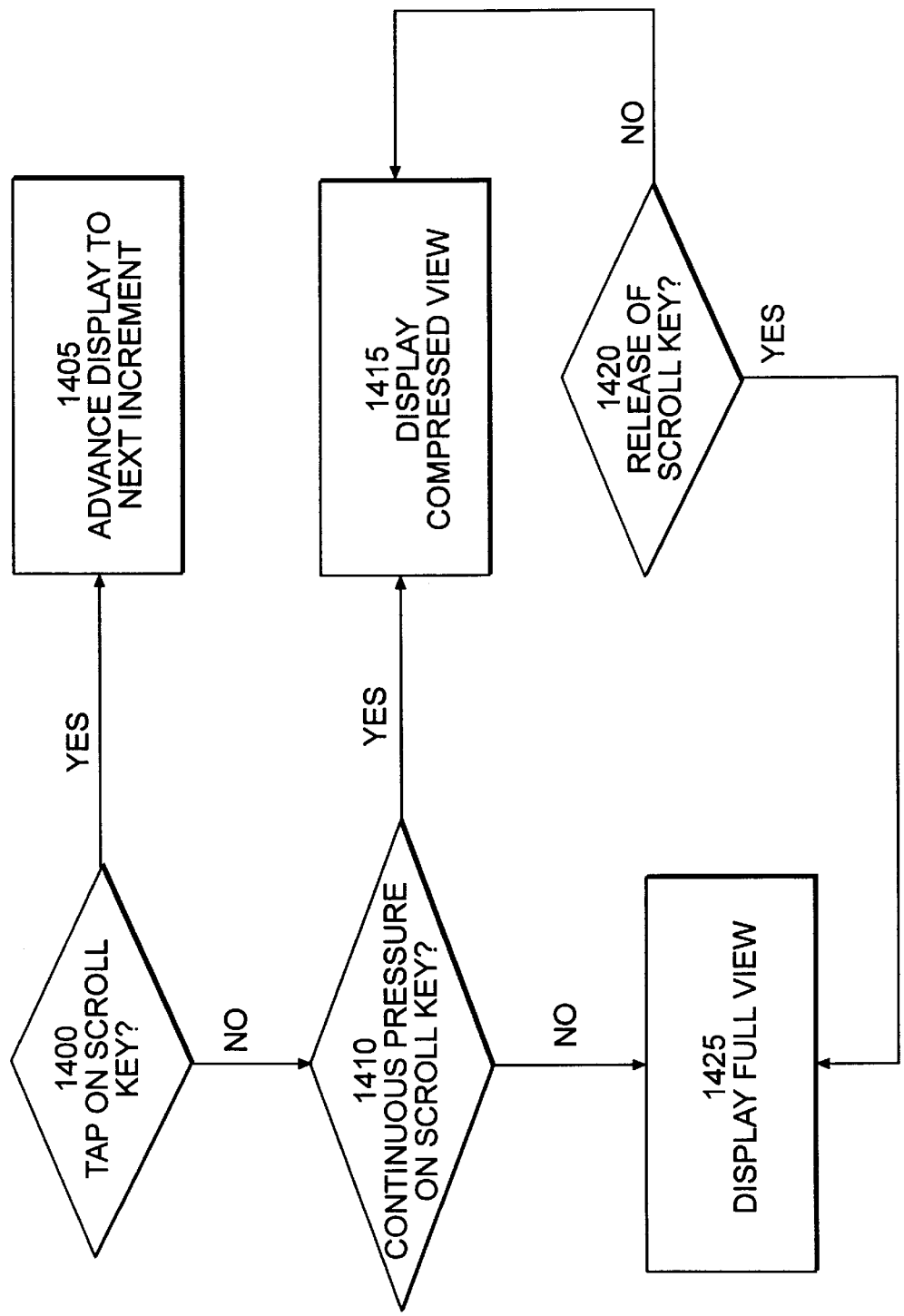
FIG. 14 is a flowchart illustrating the process for the scrolling feature.

Referring to FIG. 14, which is a flowchart of a process for implementing a scrolling feature, a user may view or search the name list by scrolling using screen-based graphical scroll keys or the hard scroll keys on keypad 330. A tap on the scroll key (step 1400) advances the display of the name list incrementally, providing the full name list view in display 340 (step 1405). One skilled in the art may easily vary the amount of advancement in the display. For example, program 520 may advance to the next telephone number with a tap on the scroll key. If the bottom line of display 340 is the last of several telephone numbers associated with a particular name, then program 520 may advance the display to the first telephone number of the next name.

Figure 13A:
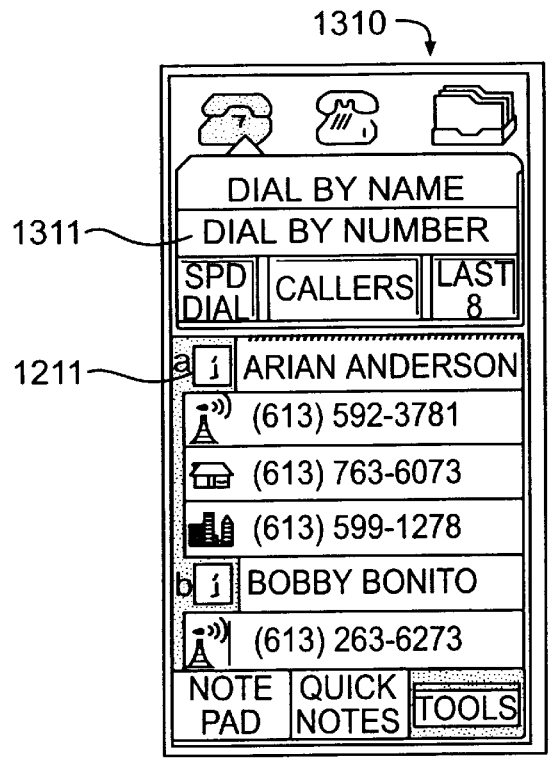
FIGS. 13A–13B show sample screens of the directory view of the entries.
Figure 13B:
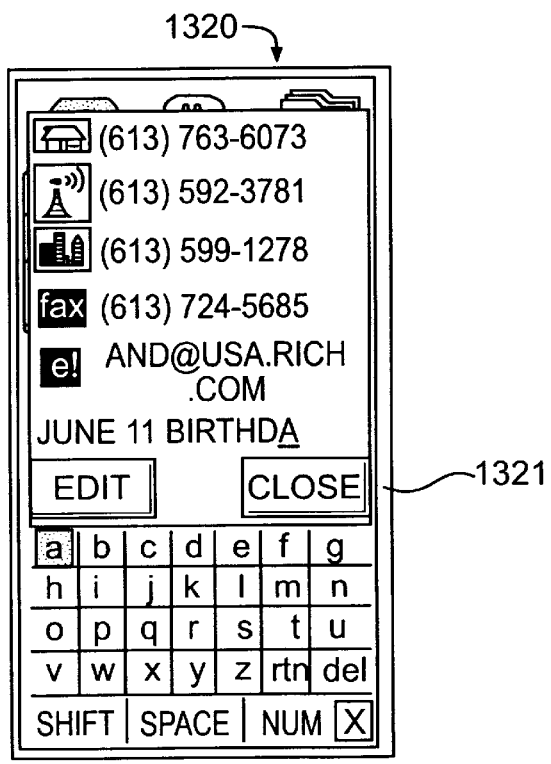

From the full view of the name list, a user may activate a call. To do so, the user simply touches the name or telephone field of the desired entry, which in turn causes program 520 to display the corresponding name and first telephone number with the associated icon in a call object 1311. Program 520 also displays associated information icon 1211 (FIG. 12A) in call object 1311 (FIG. 13A). Information icon 1211, displayed in call object 1311 or within the name list, may be selected to instantly display the EBC associated with the selected information icon 1211 as shown in screen 1320 of FIG. 13B.

To select another one of the several telephone numbers associated with the selected name, a user touches the desired telephone number. Program 520 then displays the selected telephone number in call object 1311. Call object 1311 is in a ready-mode, able to activate the associated object upon user selection. In one embodiment, call object 1311 activates call object program 540, which automatically initiates a call to the telephone number in call object 1311. If the user selects either the name or the telephone number field in call object 1311, program 520 activates call object program 540 to initiate a call.

Figure 15B:
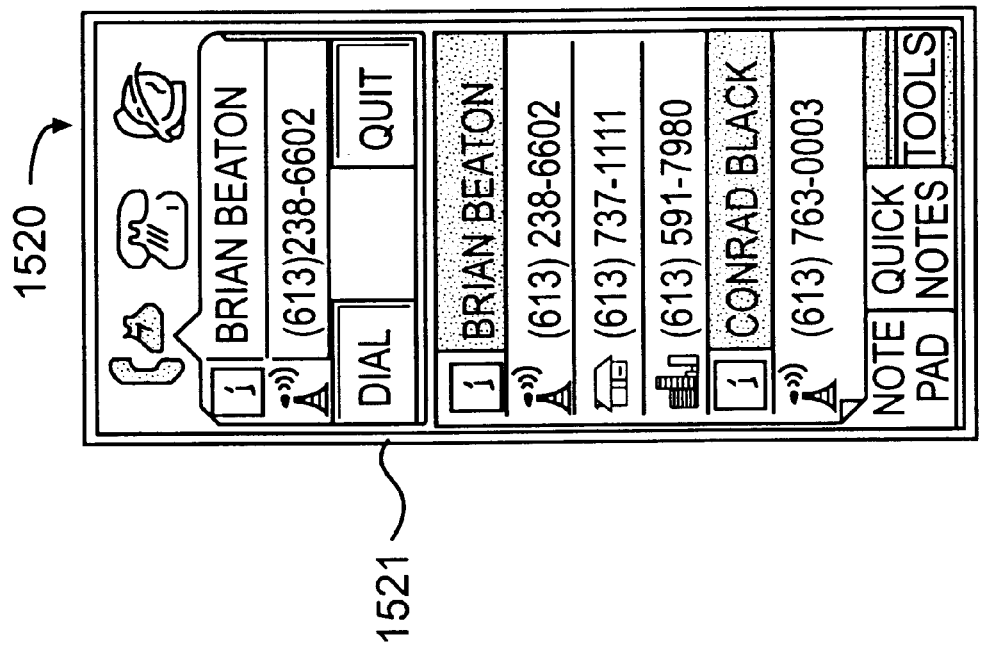
FIGS. 15A–15B show sample screens of compressed and expanded view of the directory during scroll.
Figure 15A:
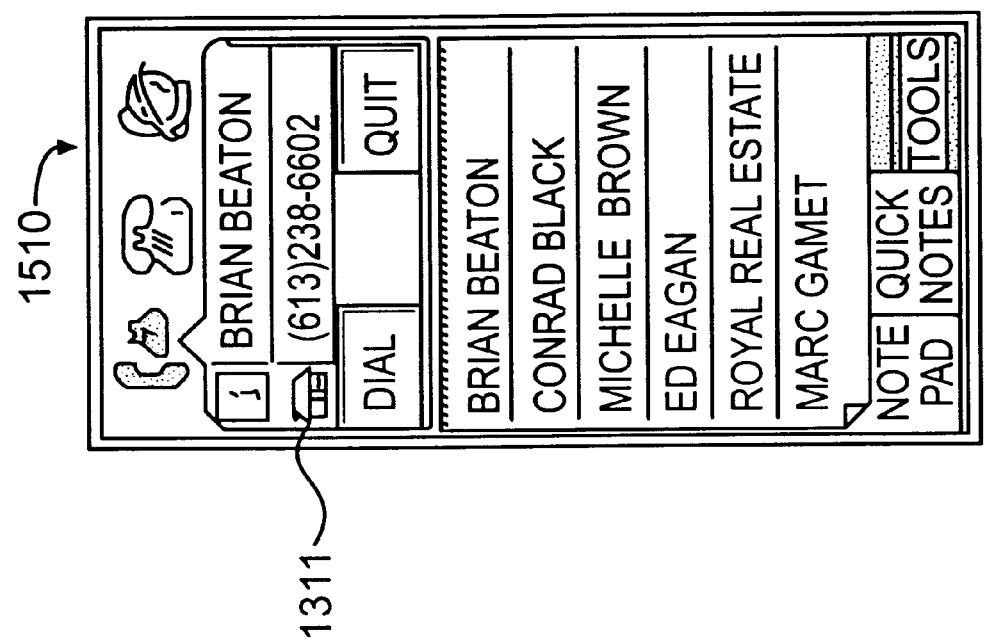

If the scroll key is pressed and held for a continuous scroll (step 1410), program 520 displays a compressed view of the name list in display 340 (step 1415). In one embodiment of the present invention, the compressed view displays only the name field of the name list as shown in screen 1510 of FIG. 15A. One skilled in the art may, however, easily modify the fields to be displayed in the compressed view of the name list.

As shown in screen 1510, during the scroll, program 520 displays the first entry in display 340 in a call object 1311. The user may stop scrolling by releasing the scroll key. Upon release (step 1420), program 520 automatically displays a full view of the entries from the compressed view as shown in screen 1520 of FIG. 15B (step 1425).

As mentioned above, a user may initiate a call to the telephone number in call object 1311 by selecting a "Dial" button 1521. If the user wants to select another entry for call object 1311, the user simply selects the name or telephone field of the desired entry from display 340 and program 520 displays the selected entry in call object 1311. Although the automatic compression and expansion feature is described in a telephony setting using mobile telephone 210 for explanatory purposes, one skilled in the art may easily apply this feature in any program or platform.

From the directory, a user may navigate easily between the name list view and the EBC view. From the name list, if the user selects information icon 1211, program 520 displays the EBC view of the entry associated with the selected information icon 1211. The EBC view floats in its own window over top of any existing displays. The user may return to the name list view by selecting a "Close" icon 1321.

While screen 1310 is displayed, a user may edit the entries of the directory using any one of the input methods discussed above. If the user selects information icon 1211, program 520 displays the EBC in full view. At this point, the user may add or edit any field of the EBC. The EBC floats on top of any currently running application and does not require the user to exit current application to launch a separate application to edit the EBC. Program 520 updates the stored EBC with the edits in the corresponding fields in table 600.

A user may also locate a particular entry of the name list without scrolling through each entry. Specifically, the user inputs a search text, for example, a specific name or keyword, and program 520 searches the fields of EBCs in table 600. The present invention employs an incremental search algorithm to make the search easier for the user. For example, if user enters the letter "M" of "Mike," program 520 will display the portion of the directory with names starting with the letter "M." A particular icon may also be used as a search criteria. Once program 520 locates the desired EBC, it displays the portion of the name list corresponding to the located entry.

Figure 16:
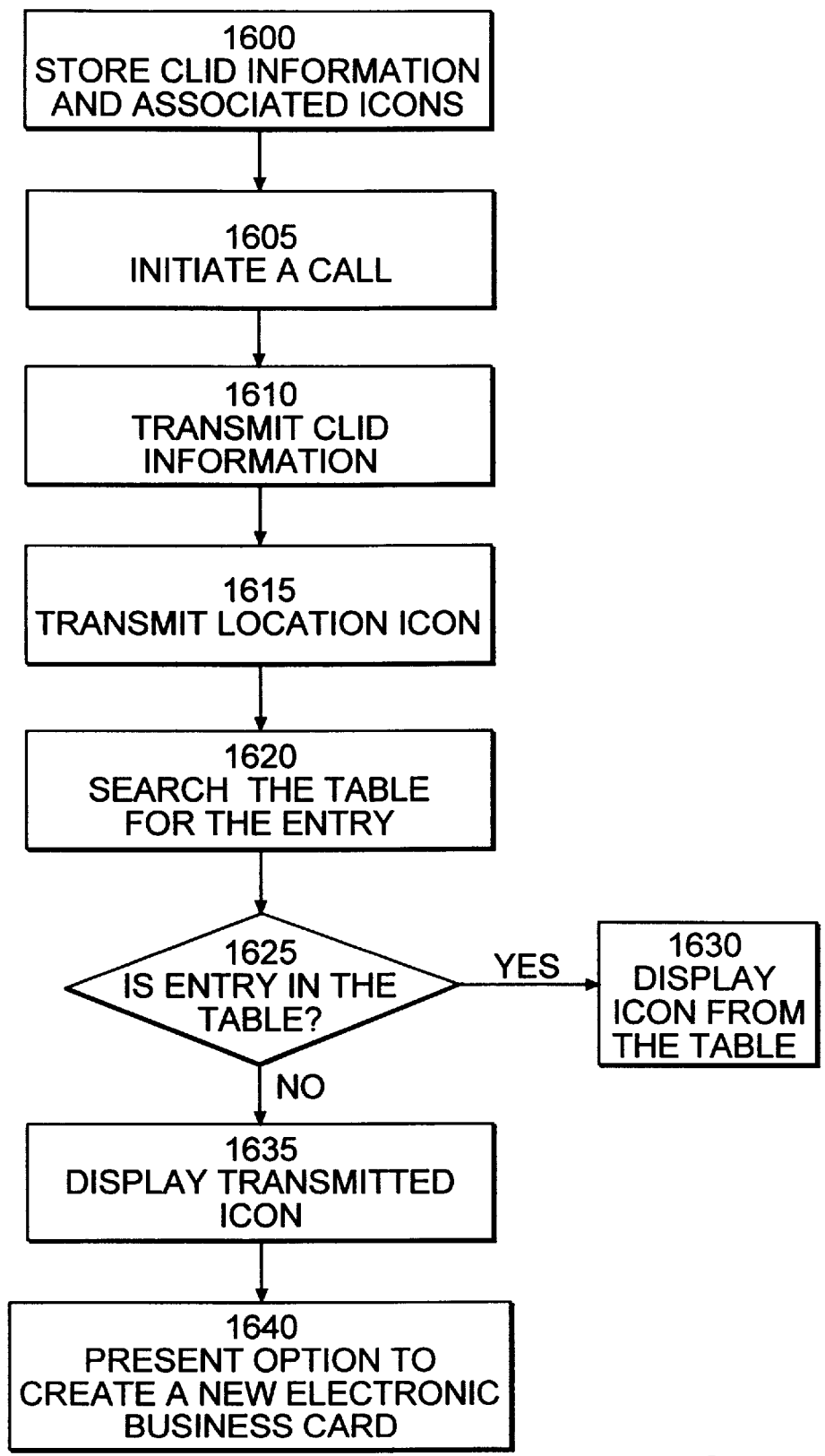
FIG. 16 is a flowchart illustrating the process for transmitting an EBC.

As previously mentioned, CLID information is stored at a telephone network and includes names and telephone numbers. Referring to FIG. 16, in one embodiment consistent with the present invention, the telephone network may also store icons associated with the telephone numbers (step 1600). In one implementation consistent with the present invention, telephone networks may receive location icons from individual subscribers and store the icons with the associated telephone numbers. For a private telephone switch, there may be a uniform location icon for all telephone numbers within the private switch. One example is a large corporation having a private switch and associating all telephone numbers of the corporation with a corporate location icon.

When a call is initiated (step 1605), the telephone network transmits the CLID information (step 1610). Shortly thereafter, the telephone network also transmits any USSD, such as a location icon (step 1615).

Once a call is transmitted to the receiver's mobile telephone 210, program 520 searches table 600 for an entry corresponding to the telephone number included in the CLID (step 1620). If there is a match (step 1625), then program 520 displays the CLID information with the icon associated with the transmitted telephone number from table 600 (step 1630).

If there is no match in table 600 (step 1625), then program 520 displays the CLID information with the transmitted icon in display 340 (step 1635). As described above in connection with FIGS. 12A–12C, program 520 presents an option to create an EBC using the transmitted CLID information and the associated icon (step 1640).

The location icon provides visual assistance to the receiver in quickly determining the location or the type of device of the caller. Additionally, if the caller's device can display graphical images, the telephone network transmits the recipient's CLID information including the associated icon. There are efforts to develop standards and designing systems for capturing and transmitting GPS (Global Positioning System) protocol. The present invention is well suited to incorporate such a feature. For example, the user may be presented with more precise GPS information about the caller's location by touching the location icon.

USSD is transmitted with a call from a caller or a non-ringing call from the switch over the telephone network. A non-ringing call from the switch occurs when the user's device is turned on and communication takes place between the telephone network and the device for standard maintenance transactions such as determining the location of the device or updating the program on the user's device for a subscriber feature. The transmitted information may be sent as a data packet of approximately 140 bytes. There are typically two possible times for transmitting USSD with respect to the timing of a call. It may be transmitted either shortly after the CLID information transfer but before user pick up, or after the completion of the call. USSD may be transmitted, however, at other times.

The user can also send and receive an EBC to another user over the GSM network. The transmitted EBC may contain the data shown in table 600. The EBC may be transmitted as an SMS text message in a similar environment as described above in connection with CLID and associated icons. Alternatively, EBCs may be stored at a central server accessible by any third party from which third party users may download the EBCs. The EBCs stored at the central server might be voluntarily submitted by users wanting to provide public access to their EBC.

To send an EBC to another user, the user selects the "Send Card" option of action menu 811 in FIG. 8. Upon the user's selection, program 520 prompts the user to input the name and phone number of the recipient as well as the name field of the EBC to be sent.

Figure 17B:
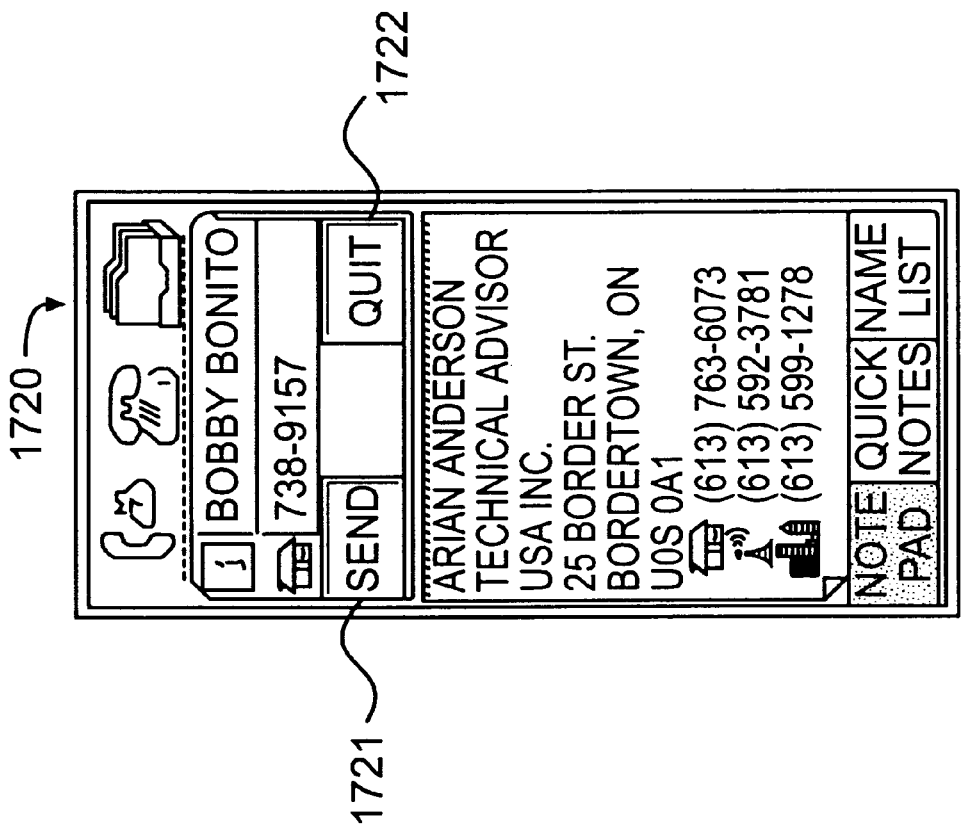
FIGS. 17A–17B show sample screens for sending an EBC.
Figure 17A:
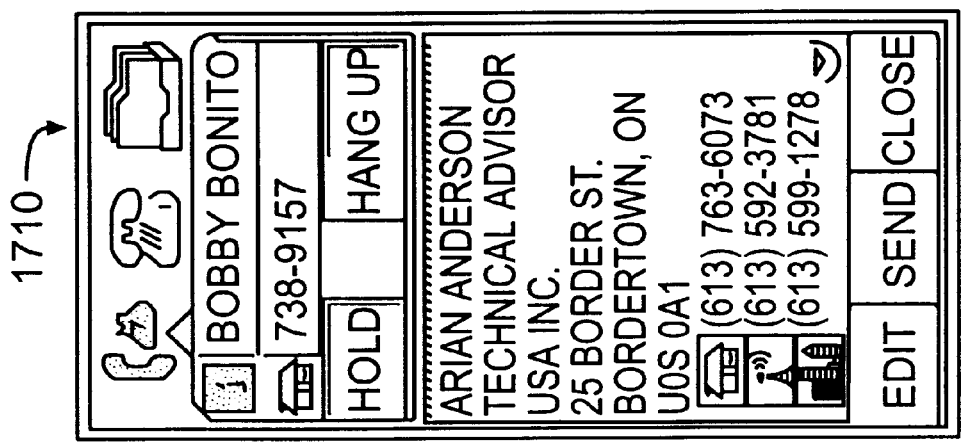

An exemplary display 1710 of FIG. 17A illustrates the user sending an EBC of "Arlan Anderson" to "Bobby Bonito." Upon verifying this information, the user activates the transmission by selecting a "Send" icon 1721 of screen 1720 of FIG. 17B. The user may also abort the send option by selecting a "Quit" icon 1722. Alternatively, the user may send an EBC while the user is engaged in a voice call with the recipient or a third party.

Figure 18B:
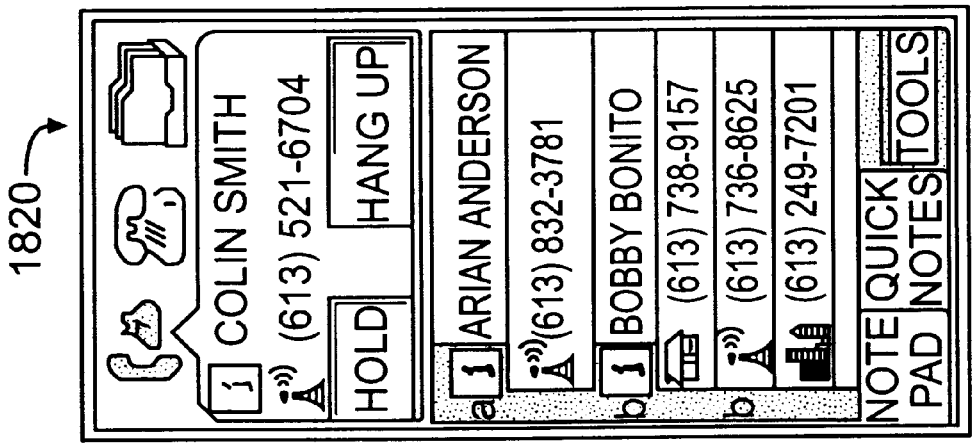
FIGS. 18A–18B show sample screens for receiving an EBC.
Figure 18A:
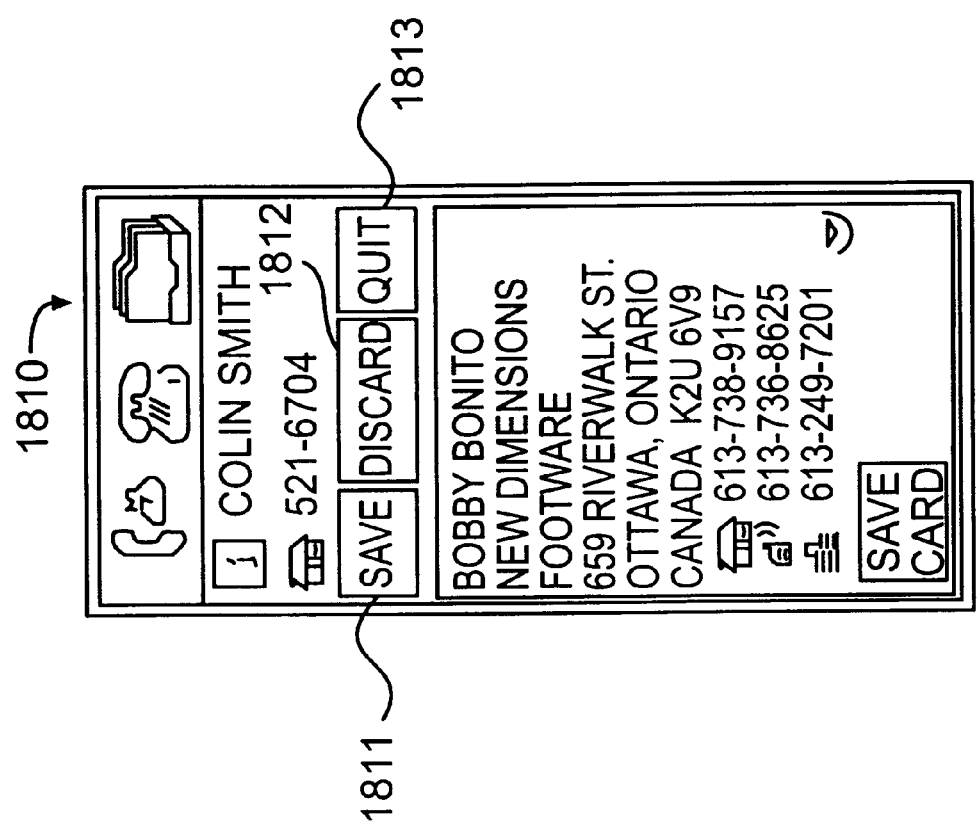

The user can also receive an EBC from another user regardless of whether the user is engaged in a voice call. When mobile telephone 210 receives an EBC, program 520 displays the source of the EBC and the EBC itself as shown in screen 1810 of FIG. 18A. In this sample display, "Colin Smith" is engaged in a voice call with the user. "Colin Smith" has also sent an EBC of "Bobby Bonito" to the user, who has an option to select any one of "Save" icon 1811, "Discard" icon 1812, or "Quit" icon 1813.

If the user selects "Save" icon 1811, program 520 automatically incorporates the fields of the received EBC into the corresponding fields of a new EBC in table 600. For example, "Bobby Bonito" is automatically saved in the name field of the new EBC. After program 520 saves the new EBC in either memory 440 or at a central location, program 520 displays a name list view of the new entry as shown in screen 1820 of FIG. 18B.

Figure 19:
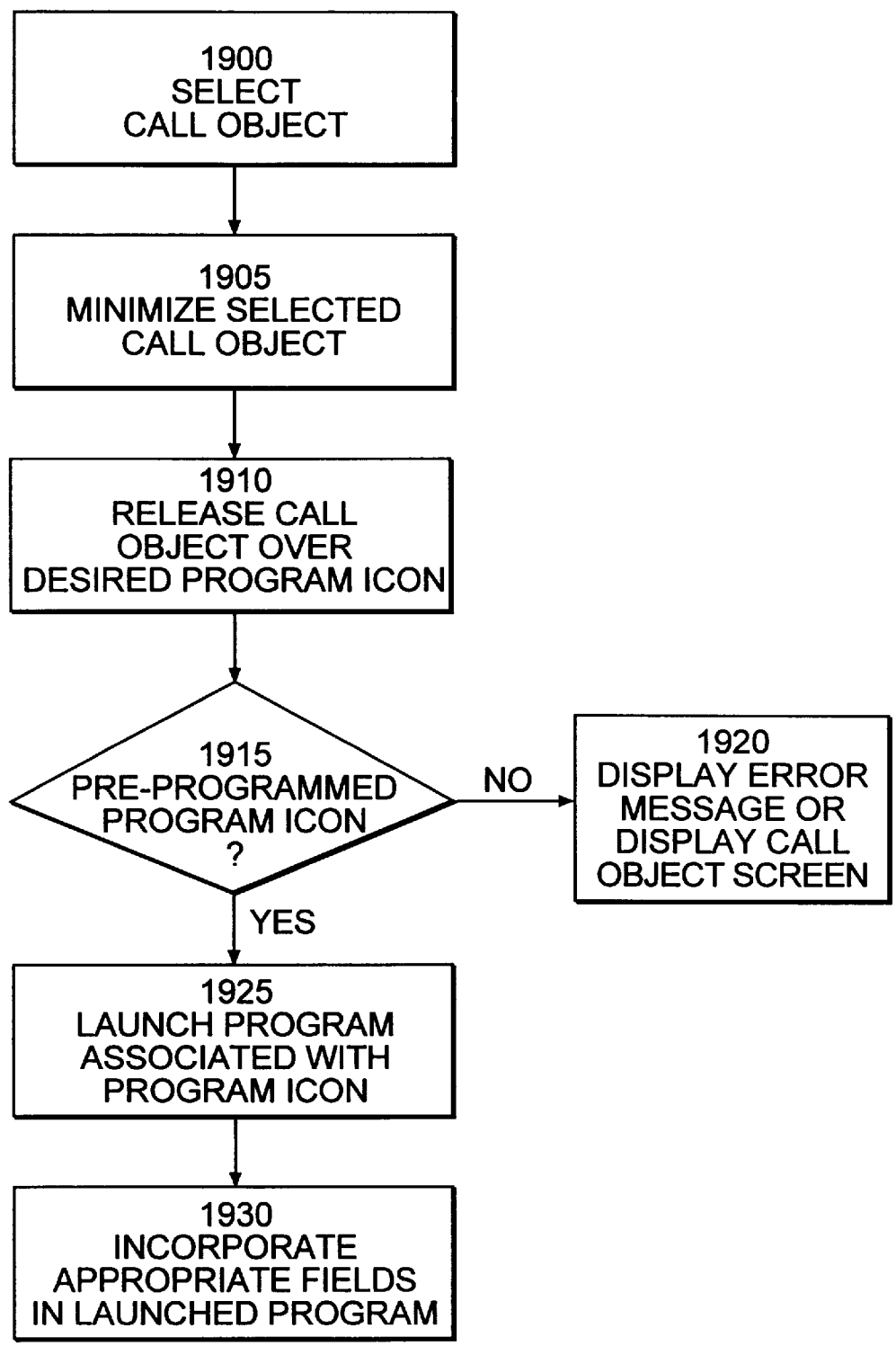
FIG. 19 is a flowchart illustrating the process for the drag-and-drop feature.

In addition to incorporating the CLID information in the directory, CLID information may also be used in various application programs. Specifically, when CLID information of the caller is displayed in mobile telephone 210 of the user, the user may incorporate the CLID information to launch other programs. FIG. 19 is a flow chart of a process for a drag-and-drop feature. First, the user drags the call object containing the CLID information over to a desired application icon using a mouse, a finger, a stylus or other selection and pointing devices (step 1900).

Figure 20B:
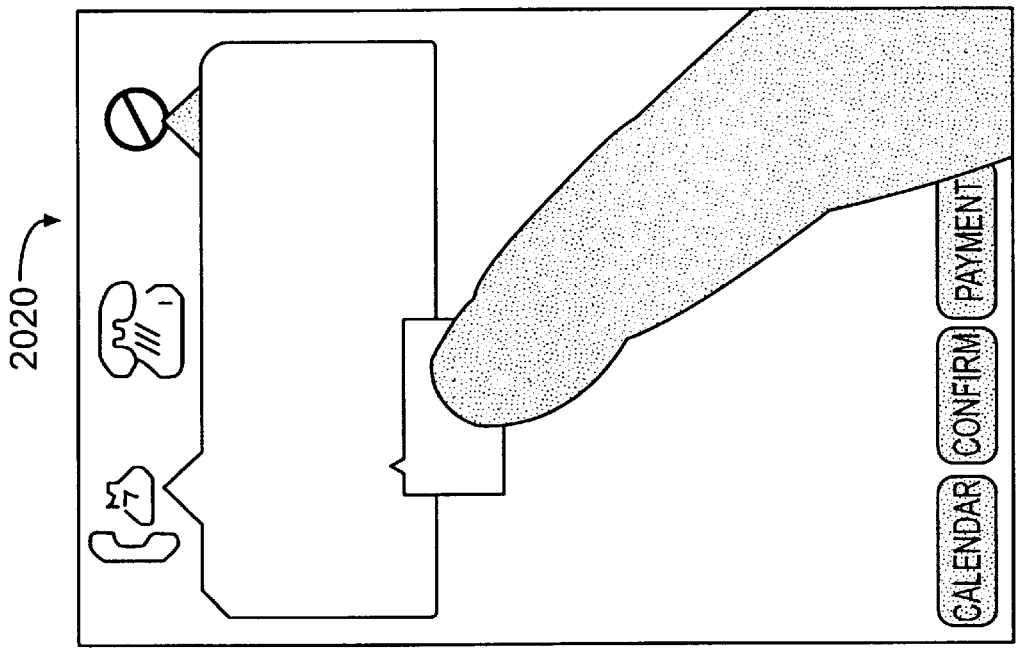
FIGS. 20A–20B show sample screens showing the drag-and-drop feature.
Figure 20A:
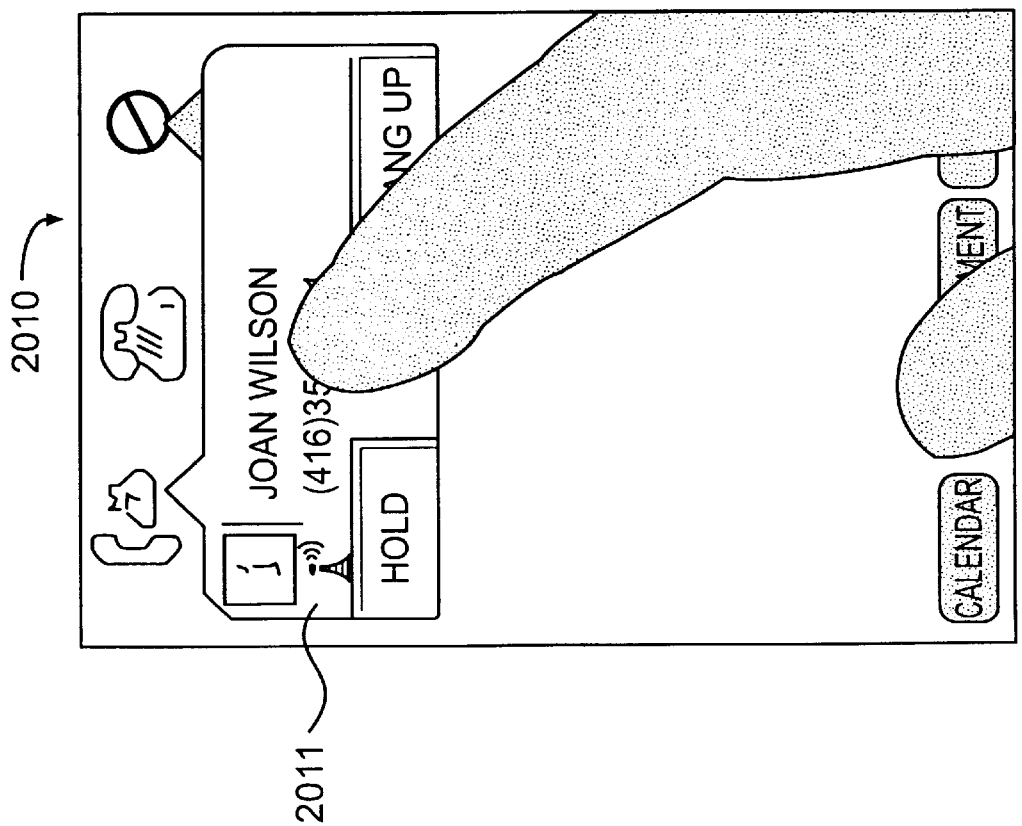

FIG. 20A shows a screen 2010 and the user selecting call object 2011 containing CLID information by touching anywhere in call object 2011 except one of the optional buttons, e.g., Hold and Hang Up. While maintaining pressure on call object 2011, if the user starts to drag call object 2011, program 520 minimizes call object 2011 as shown in screen 2020 of FIG. 20B (step 1905). Minimizing the size of call object 2011 enables the user to move around and position call object 2011 onto the desired program icon.

After the minimized call object 2011 is graphically overlaid on the desired program icon, the user releases the pressure on call object 2011 (step 1910). Thereafter, program 520 launches the program associated with the program icon (step 1925). The launched program then incorporates the CLID information into appropriate fields in the launched program (step 1930).

This drag-and-drop feature automatically transferring CLID information for use in another program is useful in many settings. For example, a reservation desk at a hotel receives a call from a customer. The hotel, upon receiving the call, has the customer's CLID information displayed in mobile telephone 210. If the customer requests a reservation for a room, the hotel clerk can drag call object 2011 onto a calendar reservation program as shown in screen 2110 of FIG. 21A.

Figure 21B:
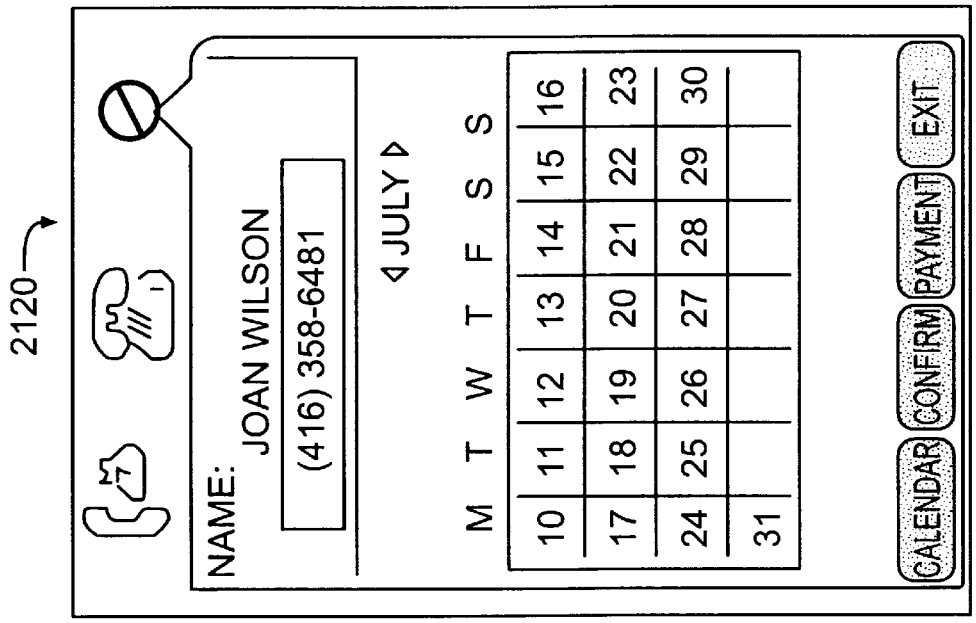
FIGS. 21A–21B show sample screens illustrating an exemplary application of the drag-and-drop feature.
Figure 21A:
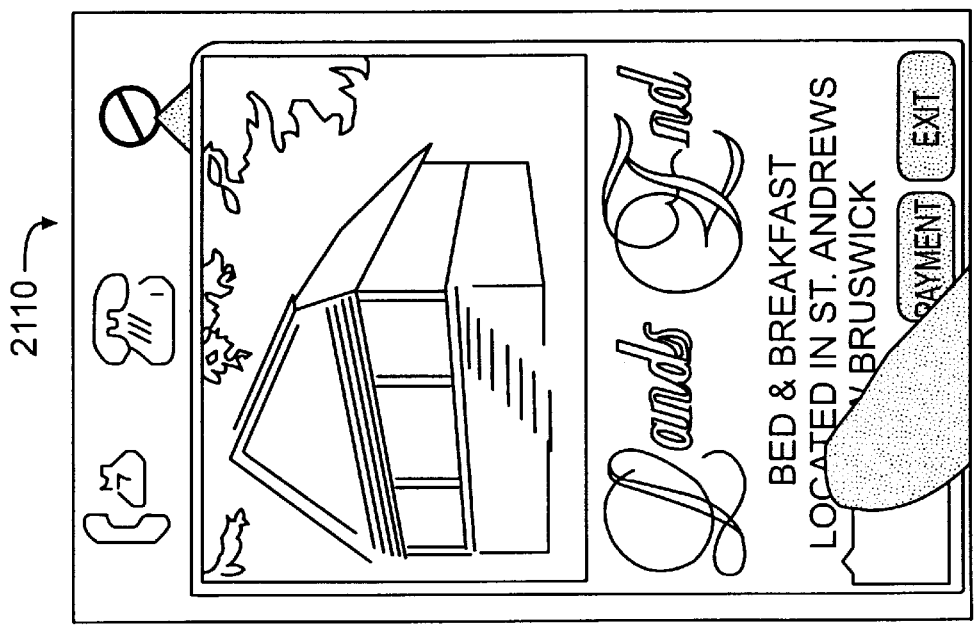

Upon release of minimized call object 2011, program 520 initiates the calendar reservation program and the reservation program incorporates the CLID information into name and telephone number fields of the reservation form as shown in screen 2120 of FIG. 21B. As mentioned above, the drag-and-drop feature may launch any program.

The programs to be launched are pre-programmed to transfer the CLID information automatically into appropriate fields in the launched program. Therefore, a user may pre-program any program likely to utilize the CLID information to accommodate the drag-and-drop feature. If the user mistakenly drags-and-drops call object 2011 onto a program icon that has not been preprogrammed (step 1915), program 520 displays an error message or simply displays screen 2010 (step 1920).

The drag-and-drop feature saves time and increases accuracy of the information by eliminating the need for the clerk to solicit and type in the name and telephone number information manually. Once the clerk verifies the CLID information is that of the caller, the CLID information may be automatically incorporated into a desired program.

There are occasions where the identity or the location of the caller does not correspond to the CLID information. For example, if the registered name of a household phone is "John Wilson" and "Alice Wilson" calls from that phone for a reservation, only the telephone number would be correct. Similarly, some callers may be calling from a different residence, public phone, or an office phone. When only part of CLID information corresponds to the caller, the hotel clerk, in the example, only needs to obtain and enter the incorrect field. If neither field corresponds to the caller, both the name and telephone numbers are entered manually.

The drag-and-drop feature is particularly useful in environments where only one person uses a telephone number. For example, wireless telephone is likely to be used by only one person and provides a desirable forum for implementing the drag-and-drop feature. The same holds true for desktop telephones.

CONCLUSION

The system and method consistent with the present invention provide a graphical icon identifying the caller's identity and the location of the call. It also facilitates the manipulation of the CLID information to offer enhanced user interfaces such as EBC and drag-and-drop. Additionally, the present invention improves searching and display of a directory, for example, by automatic compression and expansion of the directory during scrolling.

It will be apparent to those skilled in the art that various modifications and variations can be made in the system of the present invention and in construction of this system without departing from the scope or spirit of the invention. Other embodiments of the invention will be apparent to those skilled in the art from consideration of the specification and practice of the invention disclosed herein. The specification and examples should be considered as exemplary only, with the true scope and spirit of the invention indicated by the following claims.

What is claimed is:

1. A method of presenting information to a user of a communication device for a telephone network comprising the steps of:
   storing in a memory of the communication device a directory of entries each including a name, a telephone number and one or more icons individually associated with the caller and defined by the caller to suggest a characteristic of the telephone number, wherein the name corresponds to at least one telephone number and associated icon;
   receiving a call from the caller over the telephone network;
   accessing the memory for the icon individually associated with the caller's telephone number and the corresponding name; and
   displaying the caller's telephone number, the corresponding name, and the associated icon defined by the caller and suggesting the location of the caller from one or more of the telephone number and associated icon corresponding to the callers name, when said receiving step occurs.

2. The method of claim 1 further including the step of:
   locating the entry corresponding to the caller's telephone number in the directory stored in the memory of the communication device.

3. The method of claim 1 wherein the storing step further includes the substep of:
   storing the directory of entries in the memory of the telephone network.

4. The method of claim 3 further including the step of:
   transmitting the icon associated with the caller's telephone number from the telephone network to the user's communication device.

5. The method of claim 3 further including the step of:
   transmitting the icon associated with the user's telephone number from the telephone network to the caller's communication device.

6. The method of claim 1 wherein the storing step further includes the substep of:
   storing the directory of entries in the memory of the caller's communication device.

7. The method of claim 6 further including the step of:
   transmitting the icon associated with the caller's telephone number from the caller's communication device to the user.

8. The method of claim 7 wherein the receiving step further includes the substep of:
   receiving the transmitted telephone number and the associated icon from the caller's communication device.

9. The method of claim 1 further including the steps of:
   receiving a manual input from the user to call another user of the telephone network, the manual input including a telephone number, and
   associating the received telephone number with an icon representing the characteristics of that telephone number.

10. The method of claim 9 further including the step of:
    storing in the memory the received telephone number and the associated icon.

11. The method of claim 1 further including the step of:
    storing in the memory of the communication device the displayed telephone number and the associated icon.

12. The method of claim 1 further including the step of:
    receiving a user input selecting an information icon corresponding to the caller, and
    displaying to the user additional information about the caller.

13. The method of claim 1 wherein the storing step includes the substep of:
    storing in the memory the directory of entries each including a telephone number and the associated icon for a GSM network.

14. A system for presenting information to a user of a communication device for a telephone network comprising:
    a database in the memory of the communication device storing a directory of entries each including a name, a telephone number and one or more icons individually associated with the caller and defined by the caller to suggest a characteristic of the telephone number, wherein the name corresponds to at least one telephone number and associated icon;
    means for receiving a call from a caller over the telephone network;
    means for accessing the memory for the icon associated with the caller's telephone number and the corresponding name; and
    a display for displaying the caller's telephone number, the corresponding name, and the individually associated icon defined by the caller and suggesting the location of the caller from one or more of the telephone number and associated icon corresponding to the caller's name, when said receiving step occurs.

15. The method of claim 14 further including:
    means for locating the entry corresponding to the caller's telephone number in the directory stored in the memory of the communication device.

16. The system of claim 14 wherein the telephone network includes a memory, and
    wherein the database resides in the memory of the telephone network.

17. The system of claim 16 further including:
    means for transmitting the icon associated with the caller's telephone number from the telephone network to the user's communication device.

18. The system of claim 16 further including:
    means for transmitting the icon associated with the user's telephone number from the telephone network to the caller's communication device.

19. The system of claim 15 wherein the caller's communication device has a memory, and wherein the database resides in the memory of the communication device.

20. The system of claim 19 further including:
    means for transmitting the icon associated with the caller's telephone number from the caller's communication device to the user.

21. The system of claim 20 wherein the receiving means further includes:
    means for receiving the transmitted telephone number and the associated icon from the caller's communication device.

22. The system of claim 14 further including:

means for receiving a manual input from the user to call another user of the telephone network, the manual input including a telephone number, and means for associating the received telephone number with an icon representing the characteristics of that telephone number.

23. The system of claim 22 further including:

means for storing the received telephone number and the associated icon.

24. The system of claim 14 further including:

means for storing the displayed telephone number and the associated icon in the memory of the communication device.

25. The system of claim 14 further including:

means for receiving a user input selecting an information icon corresponding to the caller, and means for displaying to the user additional information about the caller.

26. The system of claim 14 wherein the database includes:

means for storing the directory of entries each including a telephone number and the associated icon for a GSM network.

27. The method of claim 1 further including the steps of:

accessing the memory for other ones of the telephone numbers and associated icons corresponding to the caller's name; and displaying the other ones of the telephone numbers and associated icons corresponding to the caller's name.

28. The system of claim 14, further including in means for:

accessing the memory for other ones of the telephone numbers and associated icons corresponding to the caller's name; and displaying the other ones of the telephone numbers and associated icons corresponding to the caller's name.

29. The method of claim 1 further including the step of:

presenting an option for storing the caller's telephone number and the associated icon in response to the received call.

30. The system of claim 14 further including:

means for presenting an option for storing the caller's telephone number and the associated icon in response to the received call.

* * * * *

UNITED STATES PATENT AND TRADEMARK OFFICE
CERTIFICATE OF CORRECTION

PATENT NO. : 6,226,367 B1
DATED : May 1, 2001
INVENTOR(S) : Colin Donald Smith et al.

It is certified that error appears in the above-identified patent and that said Letters Patent is hereby corrected as shown below:

Column 14, claim 19,
Line 55, change "claim 15" to -- claim 14 --.

Signed and Sealed this

Twentieth Day of November, 2001

Attest:

*Nicholas P. Godici*

NICHOLAS P. GODICI
*Attesting Officer*   *Acting Director of the United States Patent and Trademark Office*